(12) United States Patent
Jang et al.

(10) Patent No.: US 7,884,507 B2
(45) Date of Patent: Feb. 8, 2011

(54) REMOTE ELECTRICAL EQUIPMENT POWER SOURCE

(76) Inventors: Sei-Joo Jang, 716 Yeoksam-Dong, Gangnam-Gu, Centrevlle Apt 101-1109, Seoul (KR); Gyu-Seop Hyun, 392 Sang 1-Dong, Han-A-Reum, Apt. 1506-702, Wonmi-Gum, Bucheon-Si, Gyeongi-Do (KR)

( * ) Notice: Subject to any disclaimer, the term of this patent is extended or adjusted under 35 U.S.C. 154(b) by 497 days.

(21) Appl. No.: 11/835,597

(22) Filed: Aug. 8, 2007

(65) Prior Publication Data

US 2008/0296982 A1    Dec. 4, 2008

Related U.S. Application Data

(60) Provisional application No. 60/943,895, filed on Jun. 14, 2007.

(51) Int. Cl.
*G05F 3/06* (2006.01)
(52) U.S. Cl. ....................................................... 307/151

(58) Field of Classification Search .................. 307/151
See application file for complete search history.

(56) References Cited

U.S. PATENT DOCUMENTS 4,831,296 A * 5/1989 Nagaba ........................ 310/86

* cited by examiner

*Primary Examiner*—Jared J Fureman
*Assistant Examiner*—Dru M Parries
(74) *Attorney, Agent, or Firm*—John J. Elnitski, Jr.

(57) ABSTRACT

The present invention is a remote electrical equipment power source. The remote electrical equipment power source includes an electrical generator adapted to power remote electrical equipment and a repulsive force conversion drive. The repulsive force conversion drive includes at least two repulsive units to repulse each other. One unit is fixed, while the second is movably suspended. There is a motion inducing plate positioned between the two repulsive units and movable between the two repulsive units. The first motion inducing plate is of a material that reduces the repulsive force between the two repulsive units. There is a drive mechanism connected to second repulsive unit.

25 Claims, 26 Drawing Sheets

REMOTE ELECTRICAL EQUIPMENT POWER SOURCE

This application claims the benefit of U.S. Provisional Application No. 60/943,895 filed Jun. 14, 2007 and the following KR Applications 10-2007-0054209 filed Jun. 4, 2007, 10-2007-0054211 filed Jun. 4, 2007, 10-2007-0054213 filed Jun. 4, 2007, 10-2007-0054214 filed Jun. 4, 2007, 10-2007-0054215 filed Jun. 4, 2007, 10-2007-0054216 filed Jun. 4, 2007, 10-2007-0054217 filed Jun. 4, 2007

BACKGROUND

Most electrical equipment is powered by electricity supplied by power lines. Mobile telecommunication network equipment is such an example which has large fixed units, such as a base stations and repeaters. Power lines are expensive to install in remote locations and are susceptible to storms and other natural occurrences which can down power lines. Recently in order to reduce the cost of power line installation for electrical equipment located in remote areas, there has been an attempt to use other means of power sources, such as solar cells and windmills. However, neither has proved to be reliable power sources for the same reasons as power lines, as well as other limitations. In order to improve the reliability and reduce the service cost of the electrical equipment in remote locations, other solutions are needed that does not need an external power supply line.

It is an objective of present invention to have electrical equipment in remote locations with an internal power supply.

SUMMARY

The present invention is a remote electrical equipment power source. The remote electrical equipment power source includes an electrical generator adapted to power remote electrical equipment and a repulsive force conversion drive. The repulsive force conversion drive includes a first fixed repulsive unit in a fixed position. There is a first set of at least one motion repulsive unit suspended above the first fixed repulsive unit. The first set of at least one motion repulsive unit suspended such that the first set of at least one motion repulsive unit and the first fixed repulsive unit repulse each other due to a repulsive force that exists between the first fixed repulsive unit and the motion repulsive unit. The first set of at least one motion repulsive unit is suspended such that the first set of at least one motion repulsive unit can move relative to the first fixed repulsive unit. There is a first motion inducing plate positioned between the first set of at least one motion repulsive unit and the first fixed repulsive unit and movable between the first set of at least one motion repulsive unit and the first fixed repulsive unit. The first motion inducing plate is of a material that reduces the repulsive force between the first set of at least one motion repulsive unit and the first fixed repulsive unit. The first motion inducing plate is movable between the first set of at least one motion repulsive unit and the first fixed repulsive unit to cause the first set of at least one motion repulsive unit to move relative to the first fixed repulsive unit. There is a drive mechanism connected to the first set of at least one motion repulsive unit. The drive mechanism is connected such that the first set of at least one motion repulsive unit will move the drive mechanism, when the first set of at least one motion repulsive unit moves due to the repulsive force between the first set of at least one motion repulsive unit and the first fixed repulsive unit.

DETAIL DESCRIPTION OF INVENTION

The present invention is a remote electrical equipment power source and methods of use to have internal power at a remote location to power electrical equipment at that remote location. Wireless mobile communication network equipment, such as repeaters and base stations, are examples of electrical equipment at remote locations. The present invention allows the equipment located in remote locations to be operated without the costly installation of electric power lines.

The main component of the remote electrical equipment power source is a repulsive force conversion drive. The repulsive force conversion drive amplifies a small energy source used to convert the potential energy of a repulsive force into kinetic energy to produce a powered output. The repulsive force conversion drive operates with a motion input. The motion input only requires a small amount of energy to operate. The motion input can be produced by a small electrical device, which can be powered by a rechargeable battery that is charged by the repulsive force conversion drive itself or by other readily available ways, such as a solar cell. The present invention includes a method of assembling fixed and moving sources that produce a repulsive force with the motion input to produce a repulsive force conversion drive that can drive the likes of gear boxes and electric generators.

Figure 1:
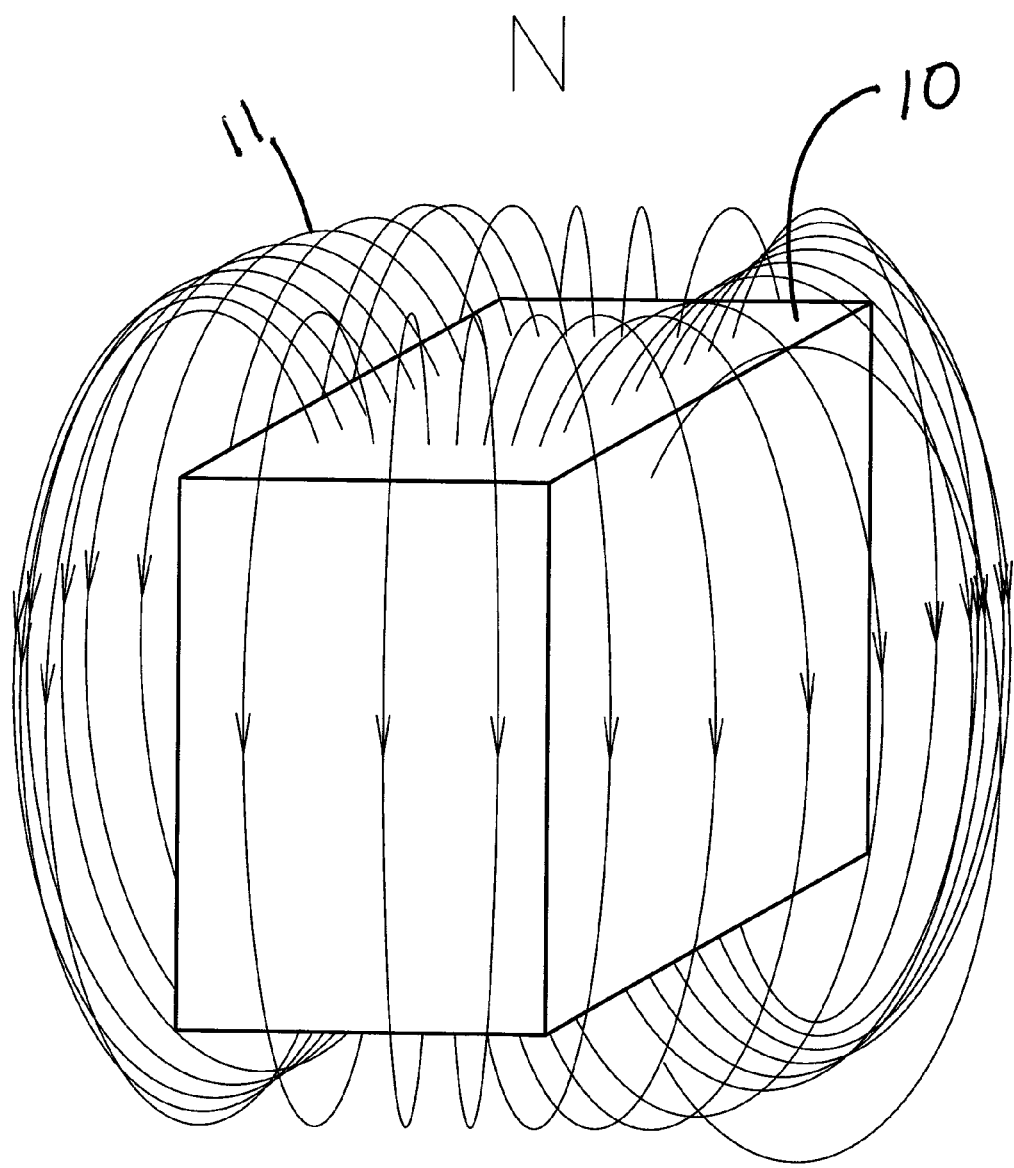
FIG. 1 is a perspective view of a square shaped permanent magnet.
Figure 2:
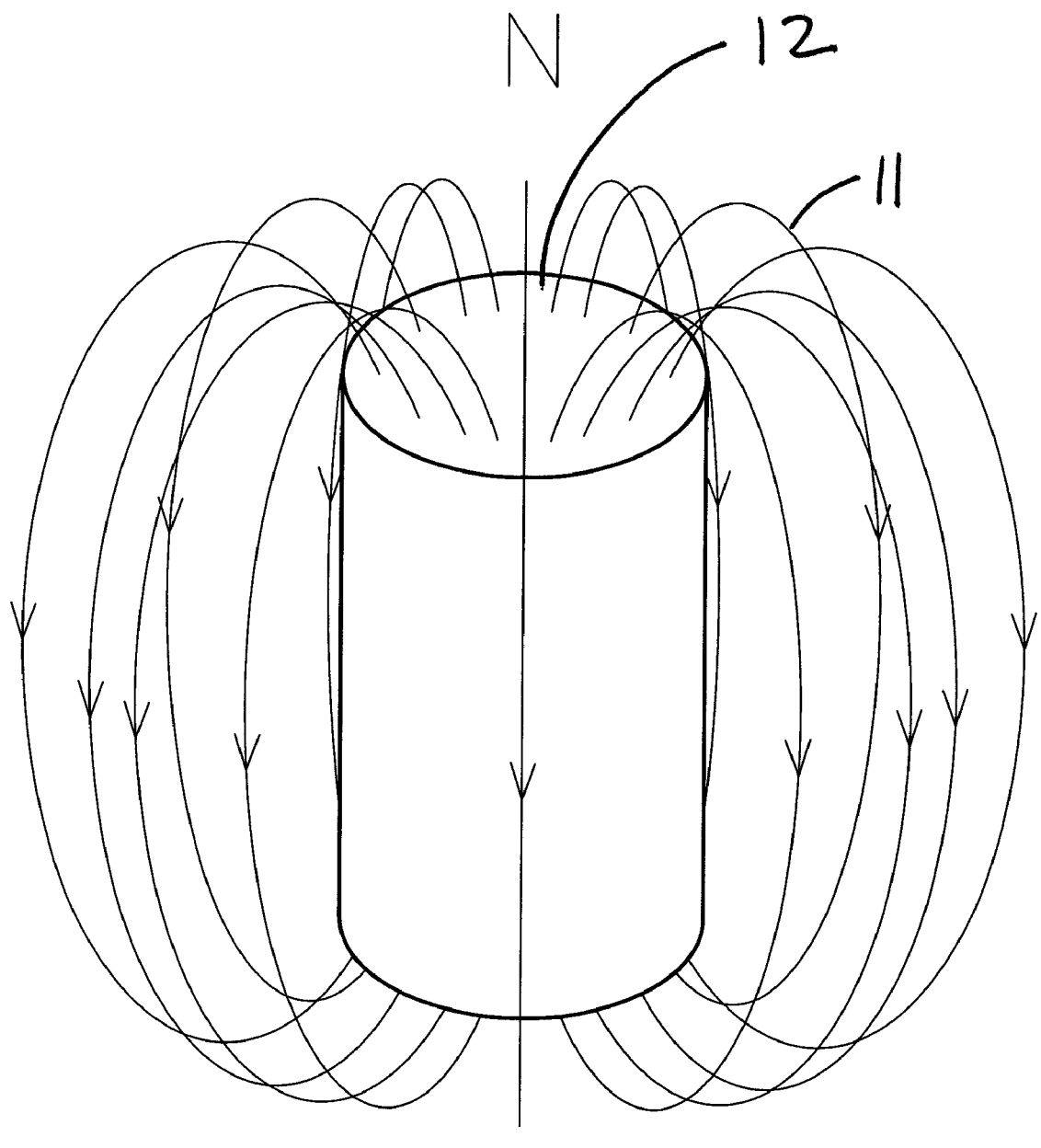
FIG. 2 is a perspective view of a cylindrical shaped permanent magnet.
Figure 3:
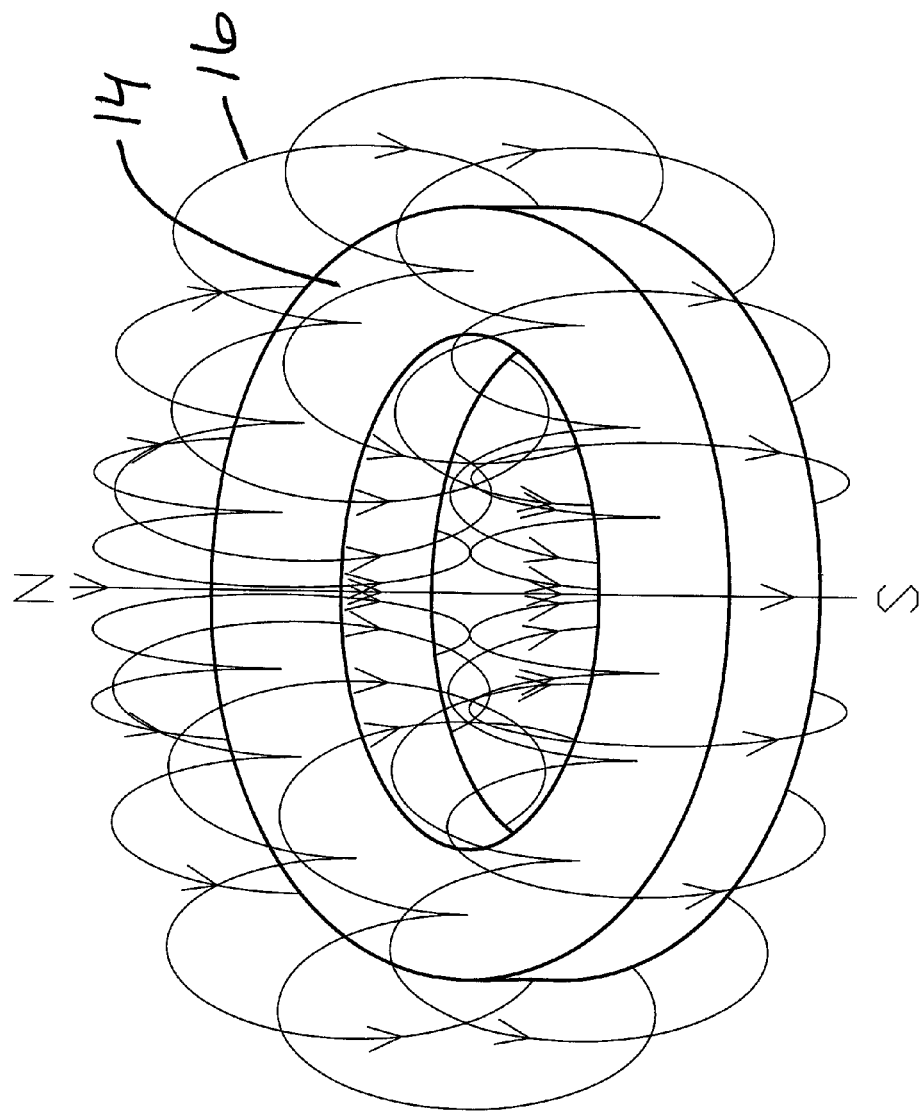
FIG. 3 is a perspective view of a doughnut shaped permanent magnet.
Figure 4:
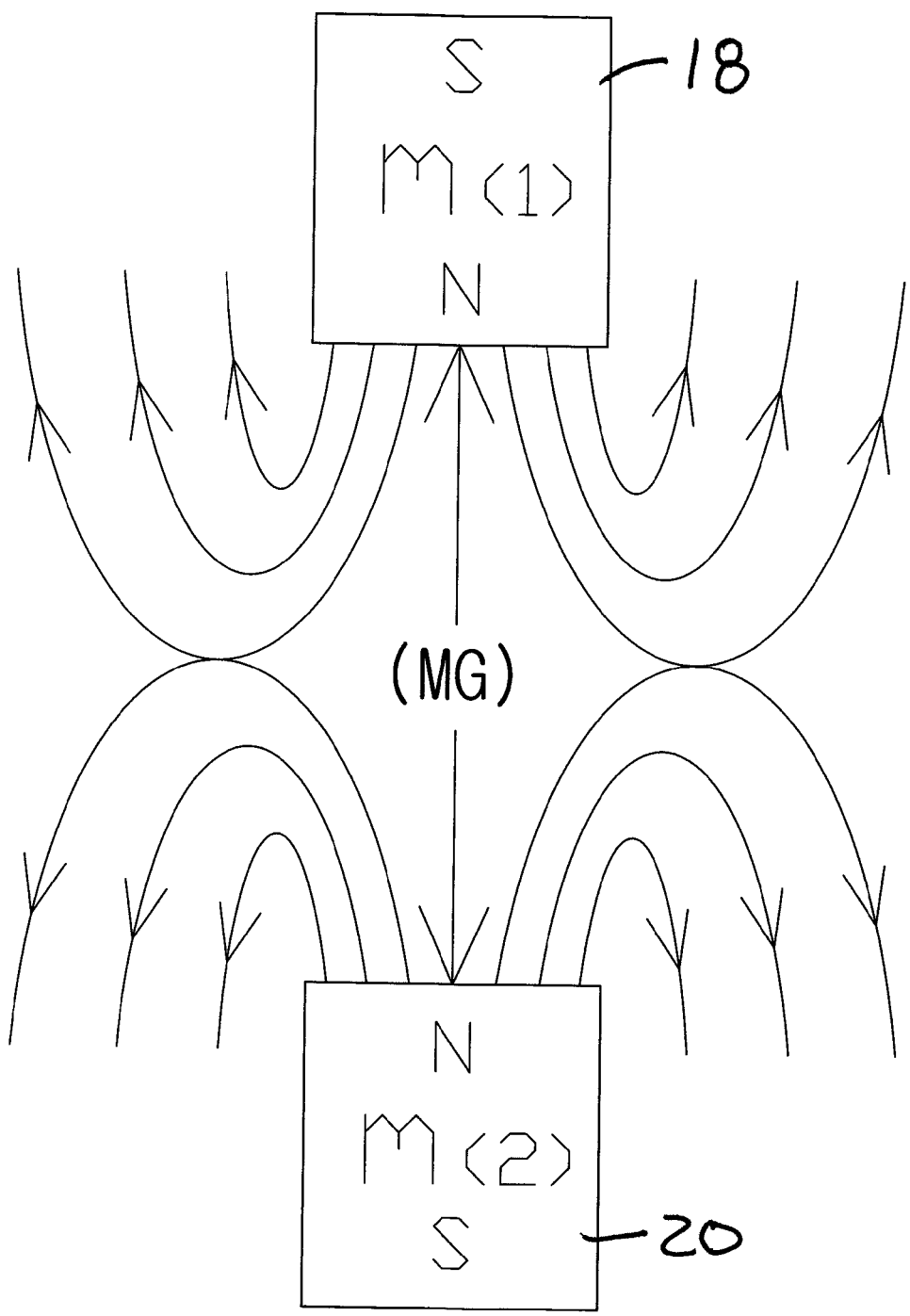
FIG. 4 is a schematic view of two permanent magnets facing each other with the same polarity.

FIGS. 1-3 show examples of permanent magnets that act as repulsive units and can be used as a source of repulsive force in the repulsive force conversion drive. FIG. 1 shows a bar magnet 10 and FIG. 2 shows a cylindrical magnet 12. FIGS. 1 and 2 show the magnetic field distribution 11 around each magnet 10, 12. FIG. 3 shows a doughnut magnet 14 and the magnetic field distribution 16 around doughnut magnet 14. FIG. 4 shows two magnets 18, 20 placed facing each other with the same polarity, in this case the polarity is North (N) of each magnet 18, 20. The South (S) polarity is also shown. The distance between the two magnets 18, 20 of FIG. 4 is (MG). It is known that when two magnets face each other with the same polarity, there is a repulsive force between the magnets. The repulsive force, (F(1,2)), between the magnets 18, 20 is due to the magnetic dipole moment of "m(1)" and "m(2)" for each magnet. The equation for repulsive force is:

$$F(1,2)=(m(1)\times m(2))/(4\pi\mu_{(0)}\times (MG)^2), \quad \text{Equation (1)},$$

where $\mu_{(0)}$ is the permeability of vacuum. The strength of the magnetic fields due to the magnet of dipole moments of "m(1)" and "m(2)" are:

$$H(1)=m(1)/(4\pi\mu_{(0)}\times(MG)^2), \quad \text{Equation (2), and}$$

$$H(2)=m(2)/(4\pi\mu_{(0)}\times(MG)^2) \quad \text{Equation (3)}.$$

Figure 5:
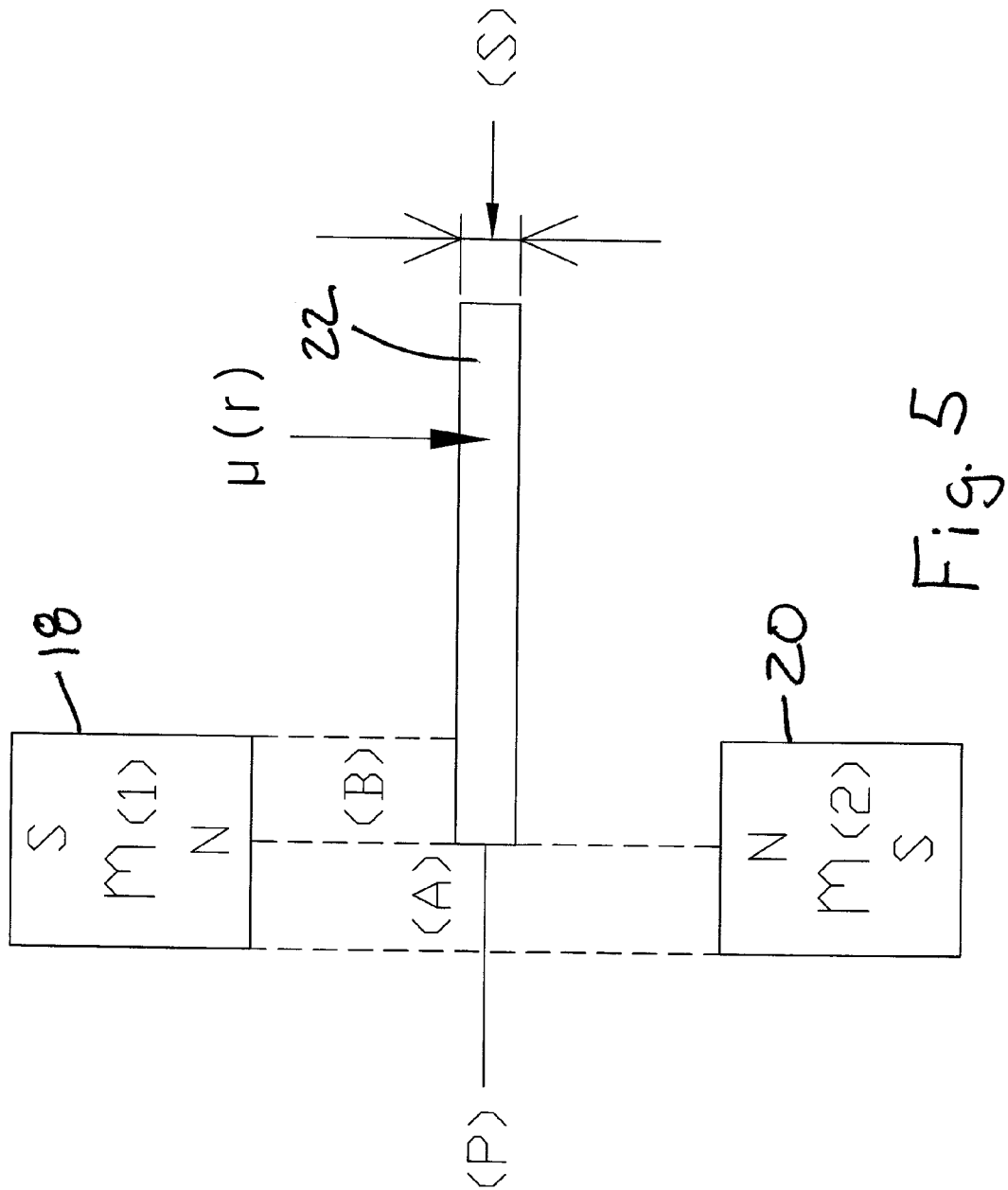
FIG. 5 is a schematic view of two permanent magnets facing each other with the same polarity according to the present invention.
Figure 6:
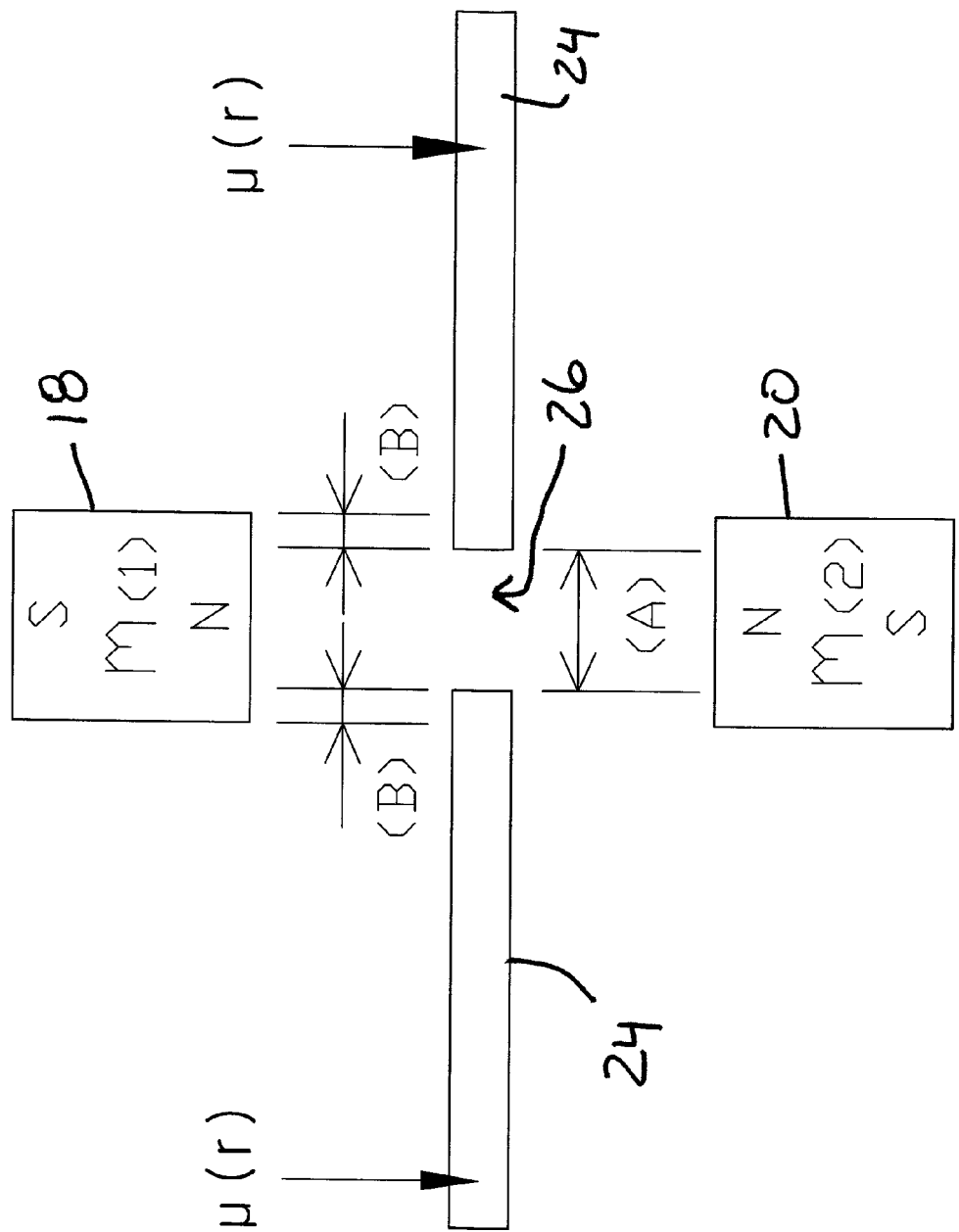
FIG. 6 is a schematic view of two permanent magnets facing each other with the same polarity according to the present invention.

FIG. 5 shows a thin plate 22 made from a material having a relatively large magnetic permeability $\mu_{(r)}$, where the permeability of the plate is $\mu_{(r)} > \mu_{(0)}$. The plate 22 is shown partially inserted between the two permanent magnets 18, 20 of FIG. 5 and acts as a magnetic field shielding plate. The resisting force against movement of plate 22 between the magnets 18, 20 is:

$$F(1)=(H(P))^2 \times \mu_{(r)} \times (S)/2, \quad \text{Equation (4)},$$

where (S) is the side area of the plate 22 and $\mu_{(r)}$ is the magnetic permeability of plate 22. H(P) is the strength of the magnetic field at the position (P) between the two magnets 18, 20. The resisting force F(1) on the plate 22 can be adjusted to very small size by making the magnitude of H(P) close to "zero" value. This can be done by moving the plate 22 through line position (P) which is center between the two magnetic fields "H(1)" and "H(2)" of the two magnets 18, 20. "H(1)" and "H(2)" are defined by equations (2) and (3) for the two magnets 18, 20. The magnetic fields of the two magnets 18, 20 are in opposite directions, as shown in FIG. 4. With the magnets 18, 20 the correct distance apart and the magnetic fields being in opposite directions, the magnetic field strength can be practically zero midway between the two magnets 18, 20, due to the dipole moments, "m(1)" and "m(2)". The side area (S) also can be made small to reduce the resisting force F(1) on the plate 22. So overall, the energy required to move the plate 22 between the magnets 18, 20 can be quite small, if positioned midway between the two magnets 18, 20. In fact, the total energy required can be just the energy needed to move the weight of plate 22 plus the friction experience during motion of the plate 22. If one of magnets 18, 20, for example magnet 18, is allowed to move freely along the tangential direction under the condition of partially shielded area of (B) as shown in FIG. 5, then it can be observed that the dipole moment "m(1)" of magnet 18 will be moving from area (A) to area (B). This is because the strong repulsive force F(1,2) of the equation (1), is present in area (A), but in area (B), the repulsive force is almost zero and there may even be a small pulling force present. This difference in repulsive force between area (A) and area (B) is dependent on the properties of the plate 22. Consequently, by moving the plate 22 along the middle position line (P), one can also move the much heavier magnet 18. The use of a thin plate 22 as a magnetic shield is the main principle of the repulsive force conversion drive of the present invention, where the magnetic field energy of two permanent magnets produces a repulsive force that is transferred into kinetic energy. Using the principle discussed, FIG. 6 shows a plate 24 which is a thin magnetic field shielding plate with a hole 26 in the middle of plate 24. Magnet 20 is fixed and magnet 18 is suspended in a way to allow movement of magnet 18. Movement of the plate 26 in a direction where the hole 26 moves between the two magnets 18, 20 will move magnet 18 in the same direction as the hole 26 passes between the magnets 18, 20. This is due the principles of the discussion above, thereby causing the repulsive force between the two magnets 18, 20 to be converted to a movement force during the movement of magnet 18. This movement of magnet 18 would be in a linear direction along the path of movement of the hole 26 of the plate 24.

Figure 7:
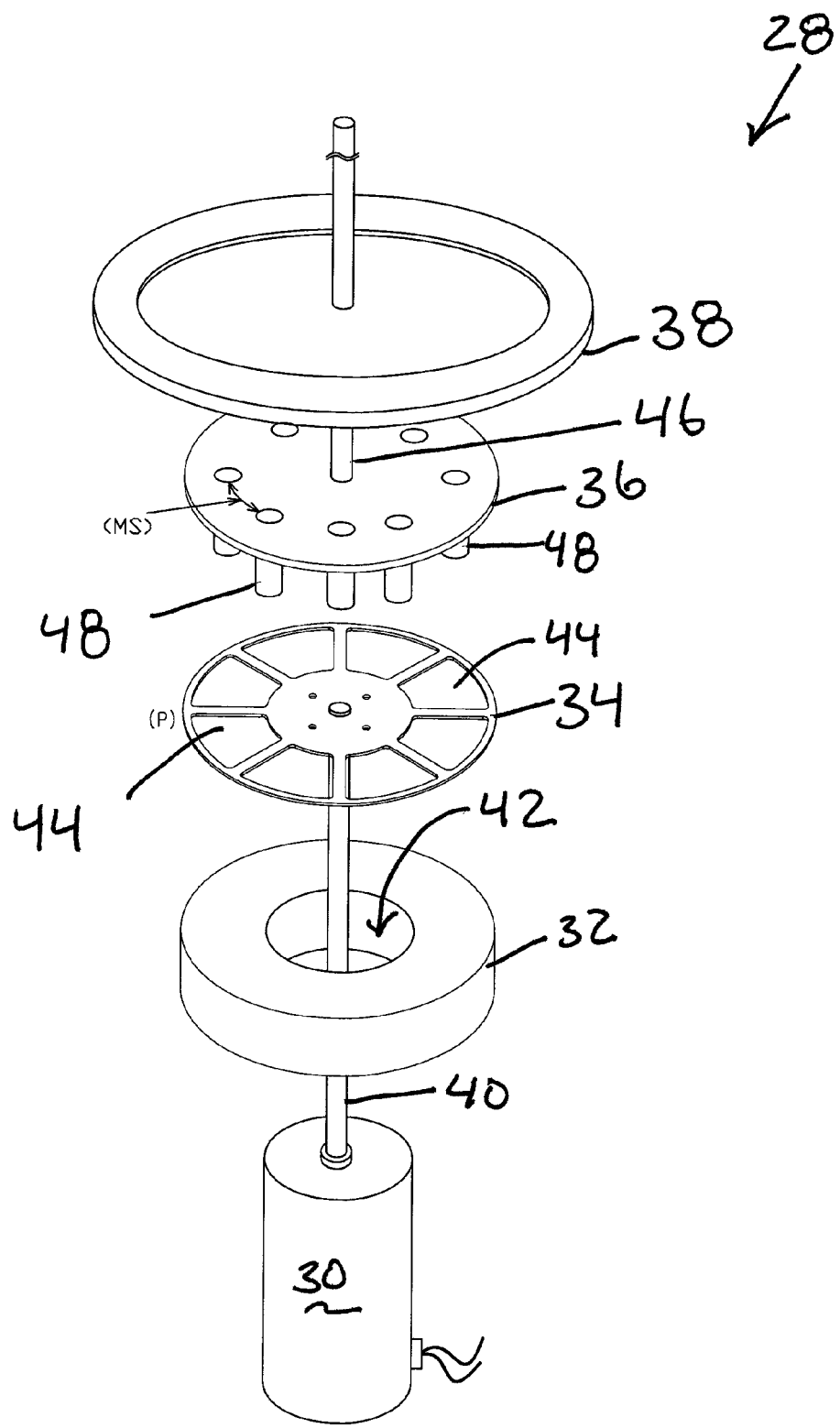
FIG. 7 is a perspective view of a repulsive force conversion drive according to the present invention.

FIG. 7 shows a repulsive force conversion drive 28 using magnets as repulsive units according to the present invention in a basic form with a rotary motion. The repulsive force conversion drive 28 includes a small input motor 30, doughnut magnet 32, motion inducing plate 34, magnet array disc 36 and flywheel 38. The doughnut magnet 32 acts as a fixed repulsive unit. The small input motor 30 includes a motor shaft 40. The motor shaft 40 projects through a center hole 42 of the doughnut magnet 32 and is connected to the motion inducing plate 34. The motion inducing plate 34 rotates when the motor shaft 40 rotates. The motion inducing plate 34 is made of a thin magnetic field shielding disc and made of materials having a high magnetic permeability. The motion inducing plate 34 includes a predetermined pattern of empty openings 44 and has a relatively small mass compared to other components of the repulsive force conversion drive 28. The magnet array disc 36 includes an output shaft 46 and is suspended independently. A bearing on the output shaft 46 or other means could be used to suspend the magnet array disc 36 independently. The magnet array disc 36 is shown with a series of disc magnets 48 extending downward towards the doughnut magnet 32. The disc magnets 48 act as motion repulsive units. The magnet array disc 36 with the disc magnets 48 can rotate, whereby the doughnut magnet 32 is in a fixed position. The magnet array disc 36 and output shaft 46 are an example of a drive mechanism. The disc magnets 48 are shown in FIG. 7 as several cylindrical shape magnets fixed along the circumference of the magnet array disc 36. The disc magnets 48 shown in FIG. 7 are positioned a distance of (MS) from each other on the magnet array disc 36. The flywheel 38 is connected to the output shaft 46 of the magnet array disc 36. It is shown in FIG. 7, that the flywheel 38, output shaft 46 and magnet array disc 36 are not physically connected to the motor shaft 40 or the motion inducing plate 34.

Figure 8:
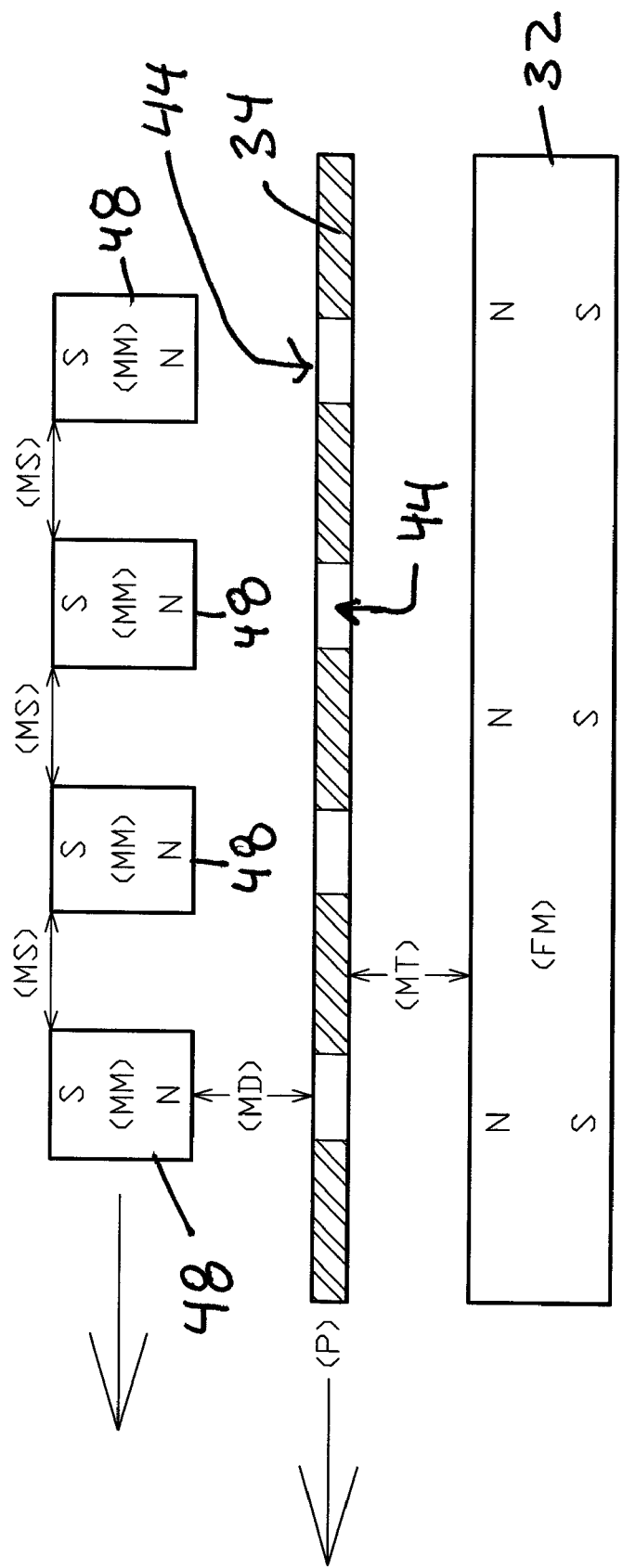
FIG. 8 is a schematic view of a repulsive force conversion drive according to the present invention.

FIG. 8 shows a cross section of the doughnut magnet 32, motion inducing plate 34 and magnet array disc 36 of the repulsive force conversion drive 28 of FIG. 7. The disc magnets 48 are positioned to face the doughnut magnet 32 such that polarity is the same and the disc magnets 48 and the doughnut magnet 32 repulse each other, where as shown in FIG. 8, North (N) faces North (N). The principles discussed above and illustrated in FIGS. 5 and 6 can be applied to the repulsive force conversion drive 28 shown in FIGS. 7 and 8. The motion inducing plate 34 is positioned between the doughnut magnet 32 and the disc magnets 48 such that the magnitude of magnetic field, H(P), along the line through position (P), is a value near zero value. Also, the motion inducing plate 34 is as thin as possible to have a small side area (S). As detailed above, the resisting force, F(1) of the equation (4), for the motion inducing plate 34 due to the magnetic field will be very small. When the motion inducing plate 34 moves in the direction past the doughnut magnet 32, the disc magnets 48 and magnet array disc 36 connected to the disc magnets 48 will move in the same direction due to the repulsive forces between the doughnut magnet 32 and the disc magnets 48 as the empty openings 44 pass the disc magnets 48, as shown in FIG. 8. Movement of the motion inducing plate 34 is achieved by rotation of the motor shaft 40 by the small input motor 30. Rotation of the motion inducing plate 34 of the repulsive force conversion drive 28 causes the magnet array disc 36 to rotate. When the magnet array disc 36 rotates, the output shaft 46 and the flywheel 38 rotate with the magnet array disc 36. Therefore, supplied energy to move the motion inducing plate 34 is much smaller than the energy released when the magnet array disc 36 is moved. This is because there is additional kinetic energy that is released during the movement of the motion inducing plate 34 that is supplied from potential energy of the repulsive force, F(1,2) of the equation (1), which exists between the fixed doughnut magnet 32 and the disc magnets 48 when arranged close to each other. The relative positions between the motion inducing plate 34, doughnut magnet 32 and disc magnets 48 are shown in FIG. 8 by distances (MD) and (MT). Distances (MD) and (MT) can be adjusted to optimum locations for the best performance of the repulsive force conversion drive 28.

Figure 9:
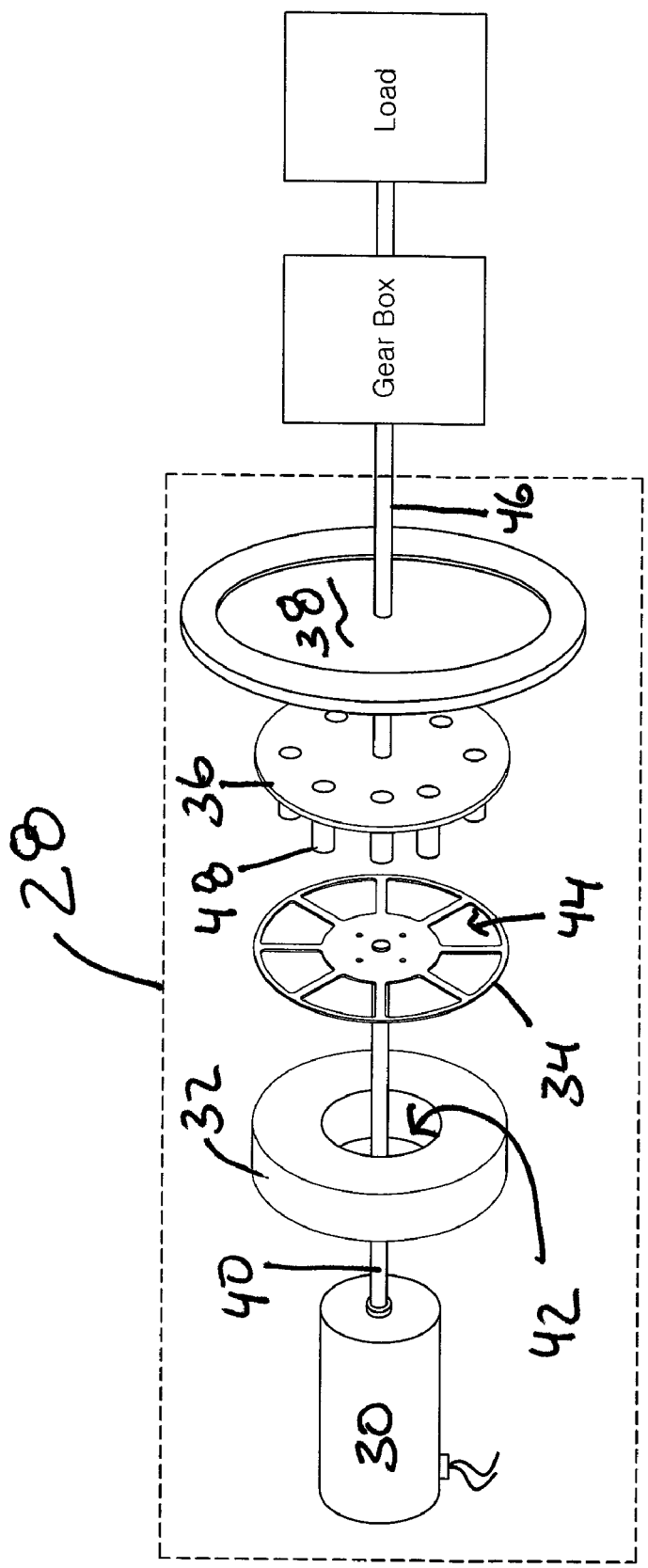
FIG. 9 is a schematic view of a repulsive force conversion drive attached to a gear box and load according to the present invention.
Figure 10:
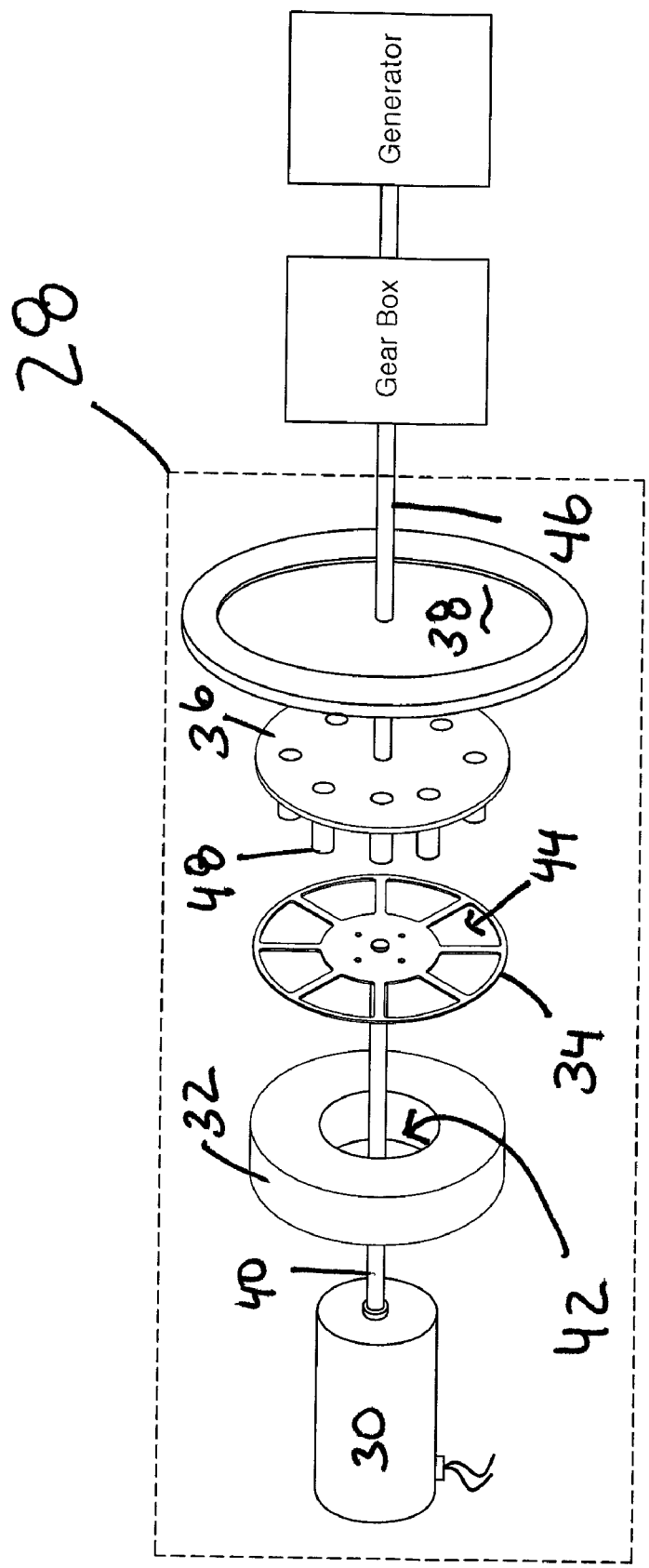
FIG. 10 is a schematic view of a repulsive force conversion drive attached to a gear box and generator according to the present invention.
Figure 11:
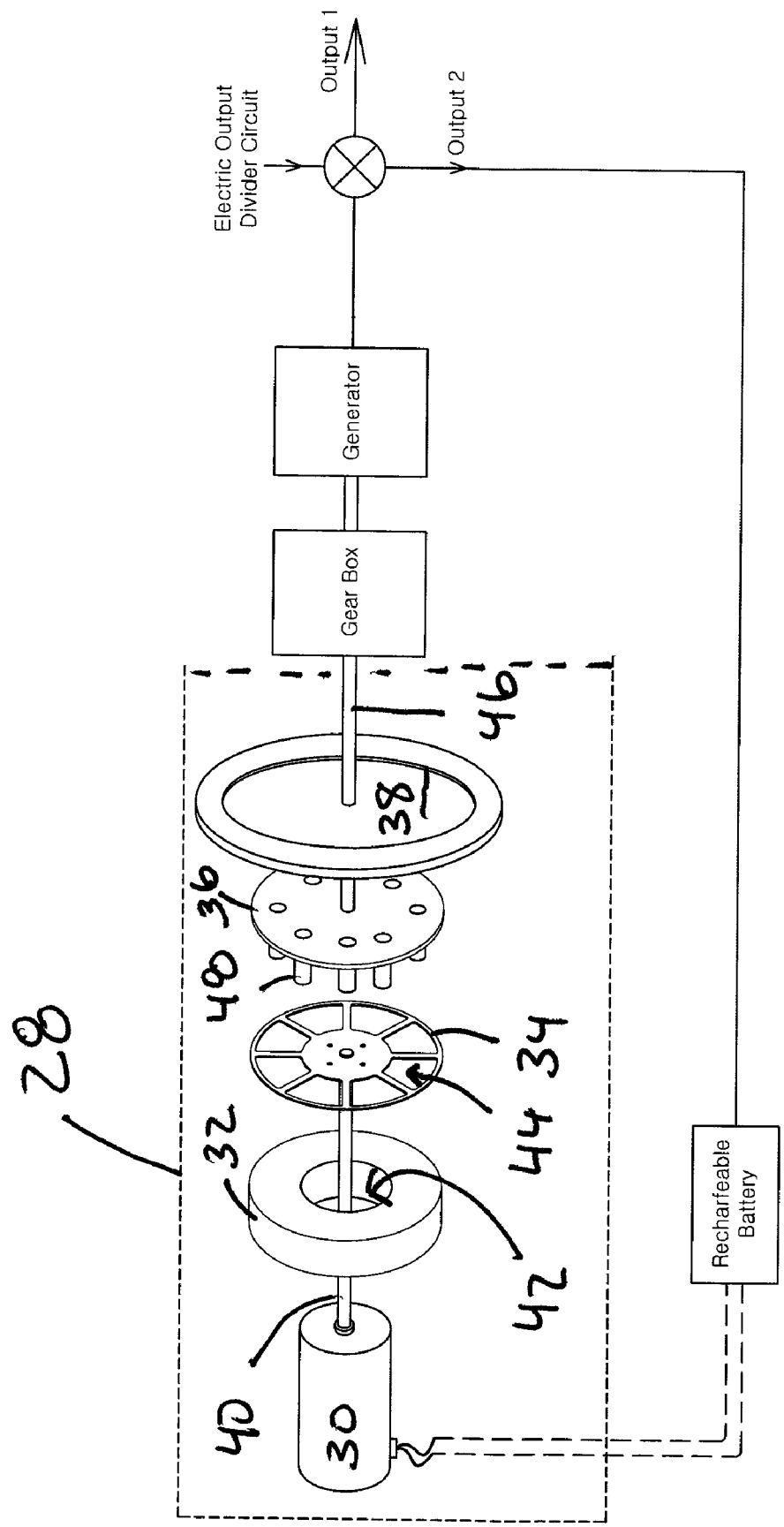
FIG. 11 is a schematic view of a repulsive force conversion drive attached to a gear box and generator along with a charging circuit and rechargeable battery according to the present invention.
Figure 12:
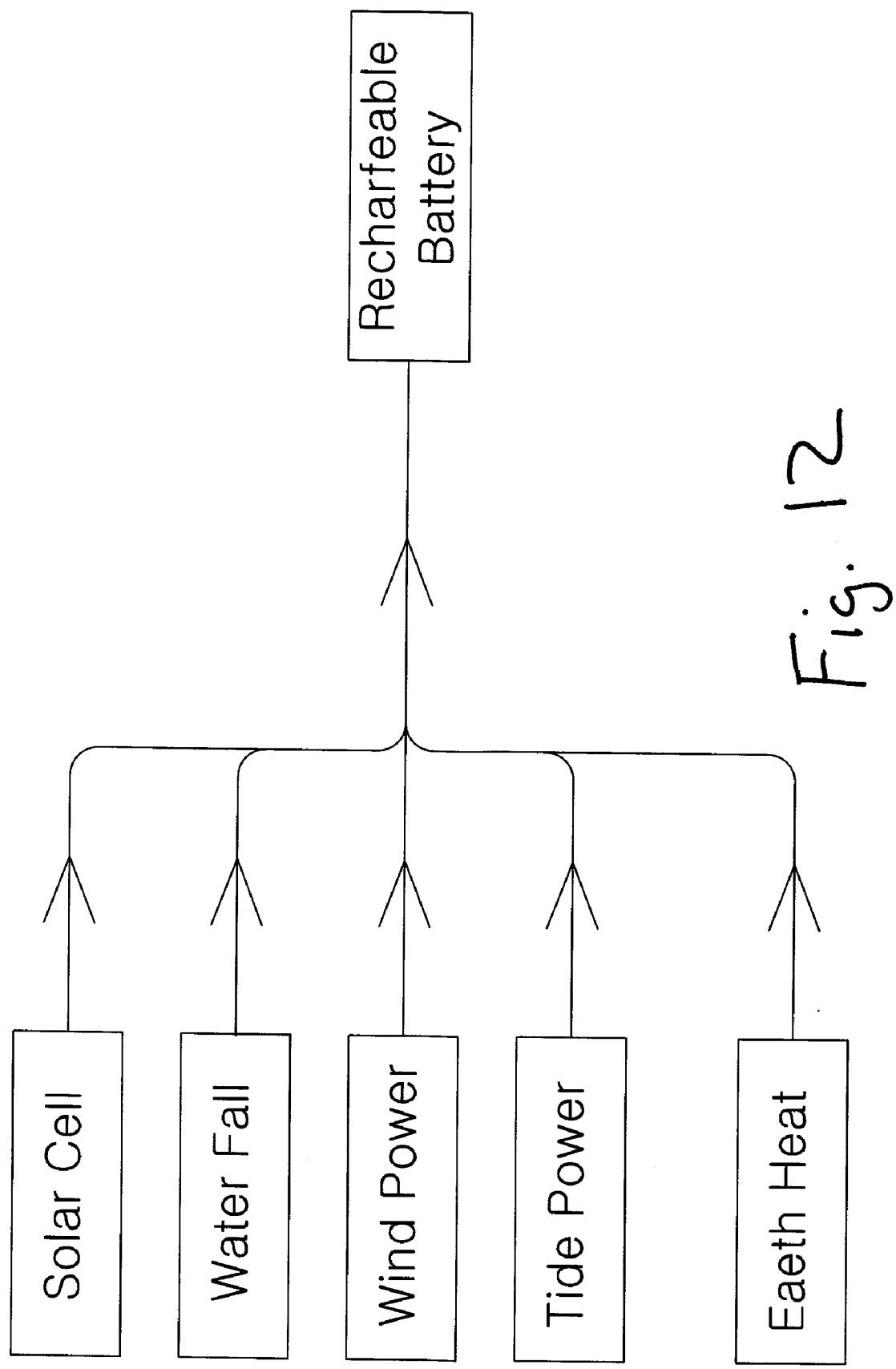
FIG. 12 is a schematic view of renewable free sources of energy that can charge the rechargeable battery according to the present invention.
Figure 13:
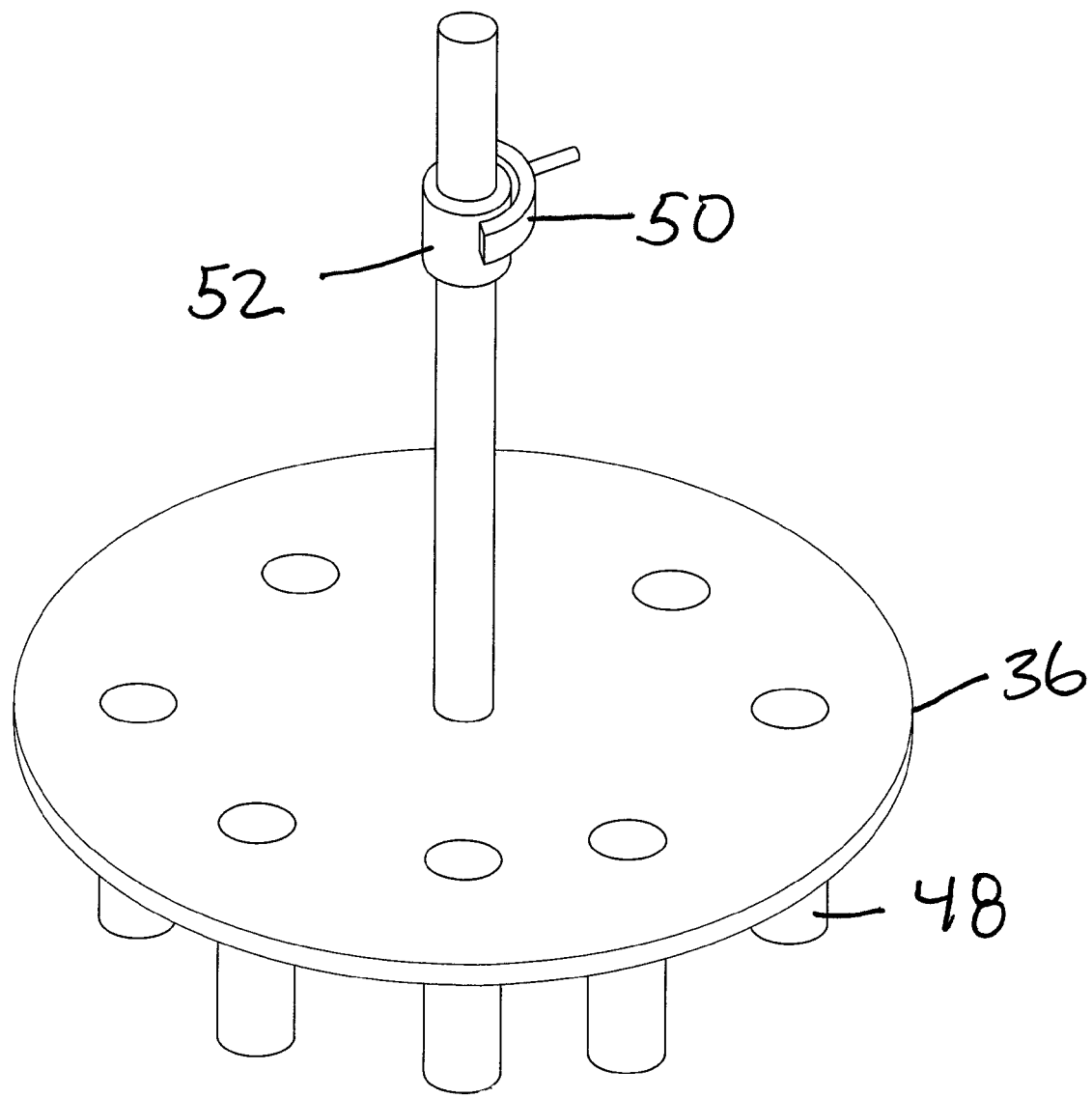
FIG. 13 is a perspective view of a brake system for the repulsive force conversion drive according to the present invention.
Figure 14:
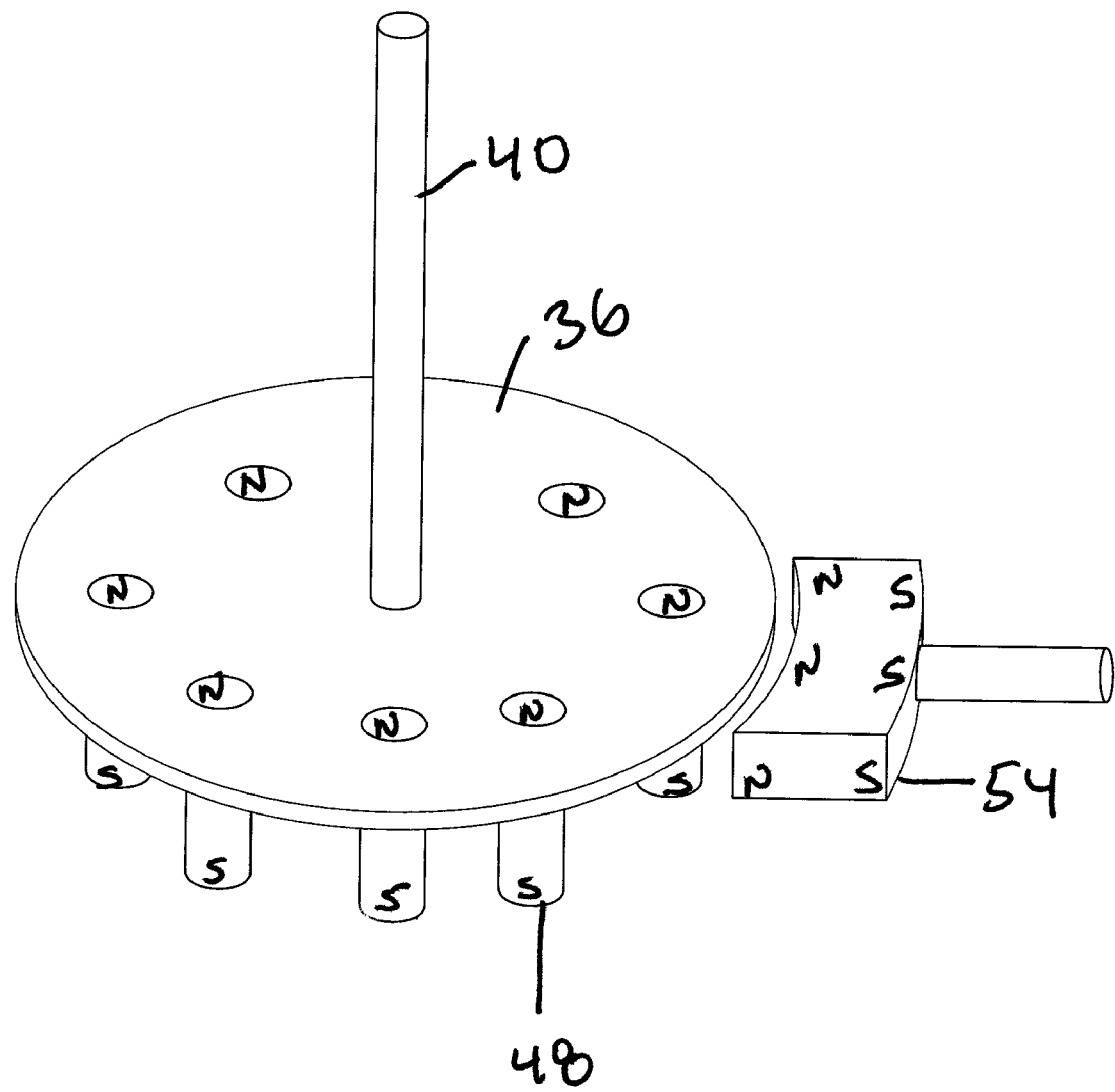
FIG. 14 is a perspective view of a brake system for the repulsive force conversion drive according to the present invention.

The repulsive force conversion drive 28 of FIG. 7 would be supported at the doughnut magnet 32, motor/motor shaft 30, 40 and output shaft 46. FIG. 9 shows the output shaft 46 of the repulsive force conversion drive 28 connected to a gear box which powers a mechanical load. Examples of a mechanical load are a transmission of an automobile or a compress in a refrigeration unit, such as a refrigerator or air conditioner. FIG. 10 shows the output shaft 46 of the repulsive force conversion drive 28 connected to a gear box which turns an electric generator. The gear box is used to control the angular speed and torque of the repulsive force conversion drive for various loads. FIG. 11 shows the small input motor 30 powered by a rechargeable battery, whereby the rechargeable battery is charged by the generator using a power distribution circuit, whereby the generator is powered by the repulsive force conversion drive. FIG. 12 shows renewable free sources of energy that can charge the rechargeable battery, such as solar cells, water fall, wind power, water current power and earth heat. FIGS. 13 and 14 show brake systems for the repulsive force conversion drive 28. FIGS. 13-14 show different brakes that can be used with a rotary motion repulsive force conversion drive 28. FIG. 13 shows a brake pad 50 against a brake collar 52 located on the output shaft 46. FIG. 14 shows a magnetic shoe 54 placed near the top of the disc magnets 48. The magnetic shoe 54 would be the opposite polarity of the top of the disc magnets 48. When the magnetic shoe 54 is near the top of the disc magnets 48, there is a pulling force which stops the magnet array disc 36. The magnetic shoe 54 could also be placed near the bottom of the disc magnets 48, but would have to be a different polarity than the bottom of the disc magnets 48.

Figure 15:
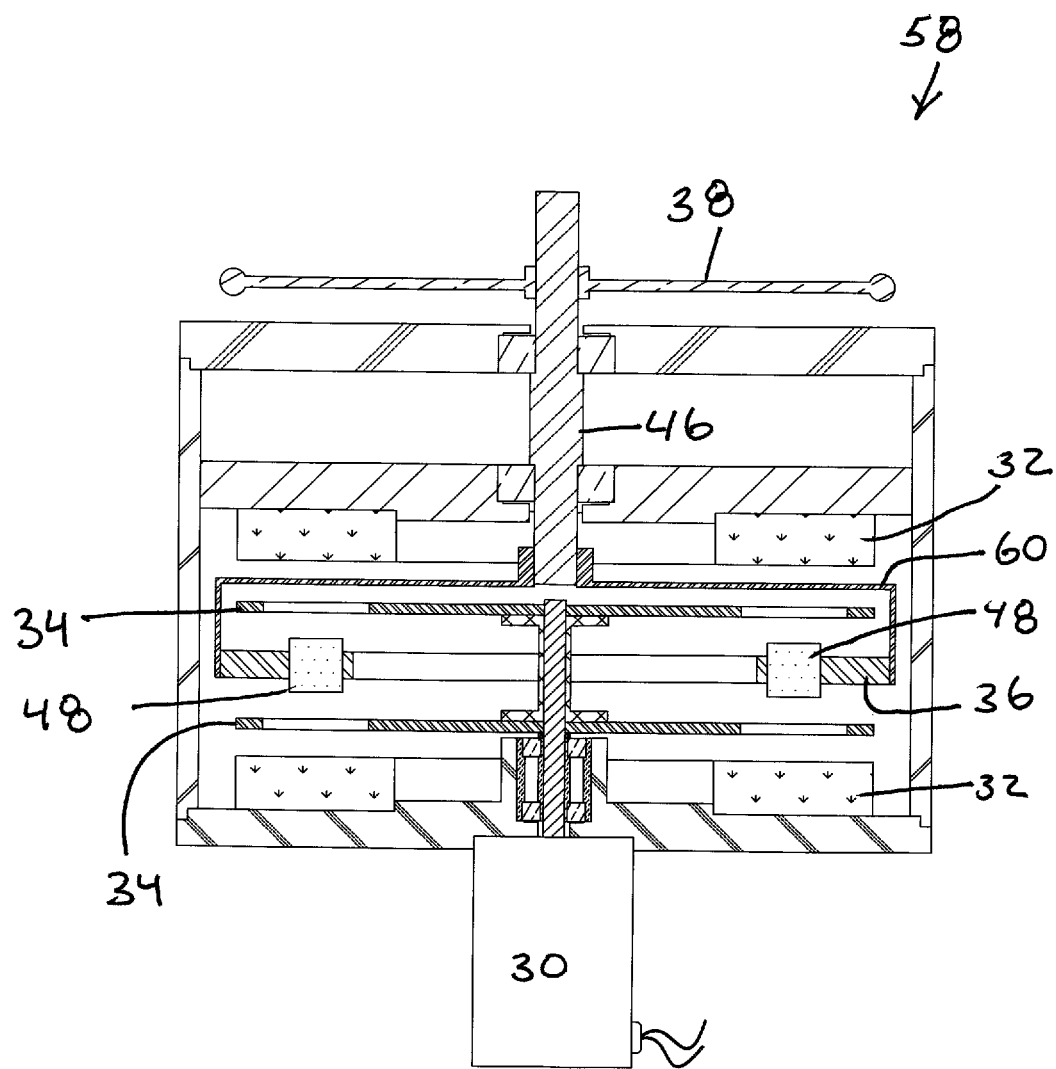
FIG. 15 is a perspective view of a repulsive force conversion drive according to the present invention.
Figure 16:
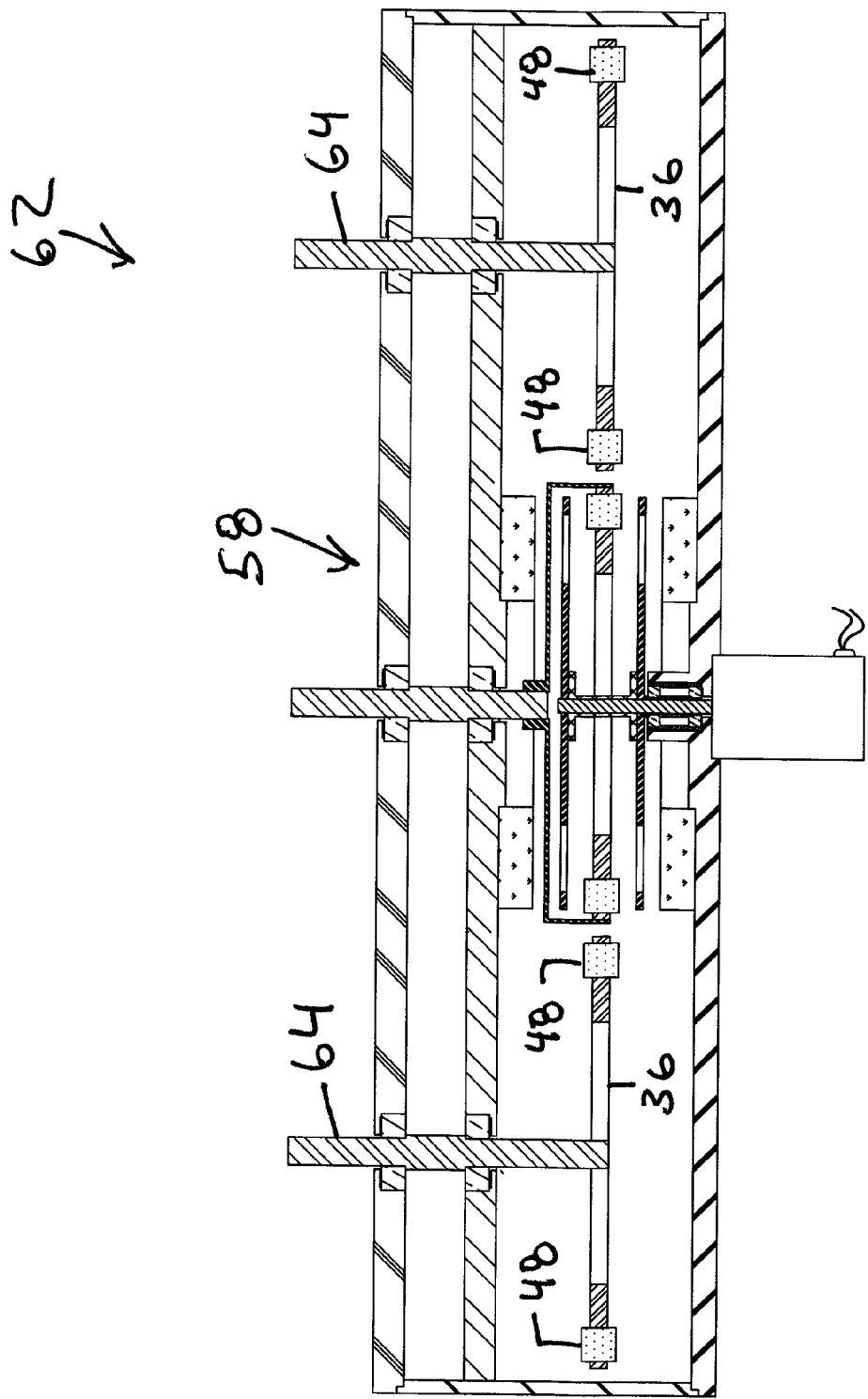
FIG. 16 is a perspective view of a repulsive force conversion drive according to the present invention.

FIGS. 15-18 show different embodiments of the rotary version of the repulsive force conversion drive using magnets. The embodiments of FIGS. 15-18 are enhanced with additional components to enhance efficiency and power of the repulsive force conversion drive using magnets. Each of the embodiments is shown having a support housing 56. The support housing includes shaft supports that include bearings around the shafts to provide rotational support for the motor 30 and output shaft 46. Some of the shaft supports also support the fixed magnets. FIG. 15 shows repulsive force conversion drive 58 with a shaft support frame 60 attached to the magnet array disc 36. The shaft support frame 60 of the magnet array disc 36 is connected to the output shaft 46 instead of the magnet array disc 36 being connected to the output shaft 46. This allows for an additional motion inducing plate 34 connected above the magnet array disc 36 and the disc magnets 48. The additional motion inducing plate 34 is attached to an elongated motor shaft 40 that passes freely through the magnet array disc 36. There is an additional doughnut magnet 32 mounted above the magnet array disc 36, such that the additional motion inducing plate 34 is between the additional doughnut magnet 32 and the disc magnets 48. The polarity of the faces of the additional doughnut magnet 32 and the disc magnets 48 are to be the same to produce a repulsive force. The shaft support frame 60 of the magnet array disc 36 allows rotation of the output shaft 46 without interference from the additional doughnut magnet 32 and additional motion inducing plate 34. FIG. 16 shows an induction repulsive force conversion drive 62 with an internal repulsive force conversion drive 58 of FIG. 15 and with two additional output shafts 64. The two additional output shafts 64 are each attached to a magnet array disc 36 with disc magnets 48, which together form two induction drives. The disc magnets 48 of the additional output shafts 64 are of a polarity such that, as the magnet array disc 36 of the repulsive force conversion drive 58 rotates, the disc magnets 48 of the magnet array disc 36 of the repulsive force conversion drive 58 pull along the disc magnets 48 of the additional magnet array discs 36 and cause the additional magnet array discs 36 and the additional output shafts 64 to rotate.

Figure 17:
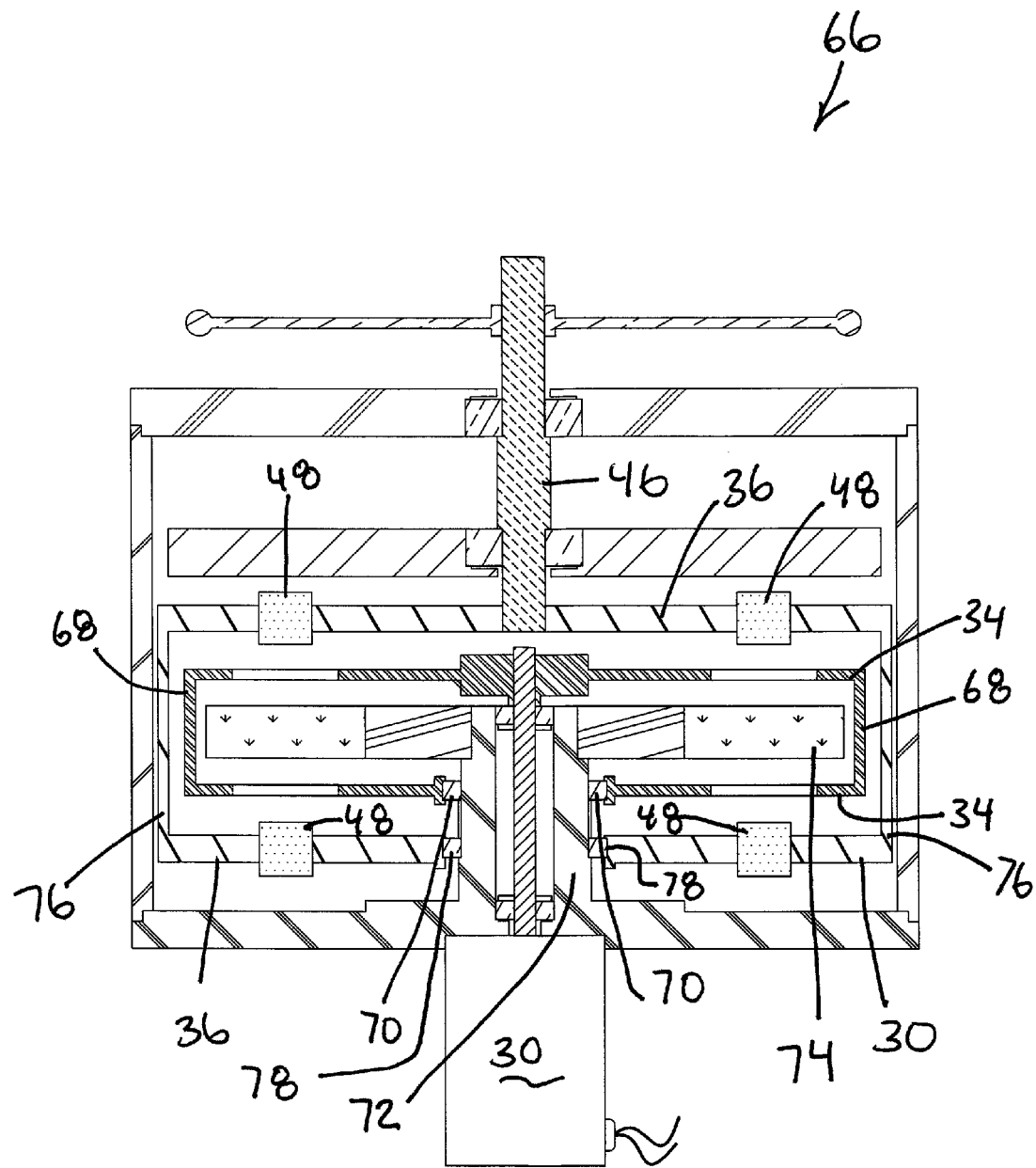
FIG. 17 is a perspective view of a repulsive force conversion drive according to the present invention.

FIG. 17 shows a repulsive force conversion drive 66 that is a form of an inverse version of the repulsive force conversion drive 58 of FIG. 15. The repulsive force conversion drive 66 has a first motion inducing plate 34 connected to the motor shaft 40 and a second motion inducing plate 34 mounted below the first motion inducing plate 34 using support sides 68. The second motion inducing plate 34 rides along bearings 70 that are between the second motion inducing plate 34 and a support shaft 72. Mounted between the first motion inducing plate 34 and second motion inducing plate 34 is a fixed magnet 74. The fixed magnet 74 is shown supported by the support shaft 72. Mounted to the output shaft 46 is a first magnet array disc 36 with disc magnets 48. The first magnet array disc 36 is mounted such that the first motion inducing plate 34 is between the first magnet array disc 36 and the fixed magnet 74. There is a second magnet array disc 36 with disc magnets 48 that is attached to the first magnet array disc 36 by sides 76. The second magnet array disc 36 is mounted such that the second motion inducing plate 34 is between the second magnet array disc 36 and the fixed magnet 74. The second magnet array disc 36 rides along bearings 78 that are between the second magnet array disc 36 and the support shaft 72.

Figure 18:
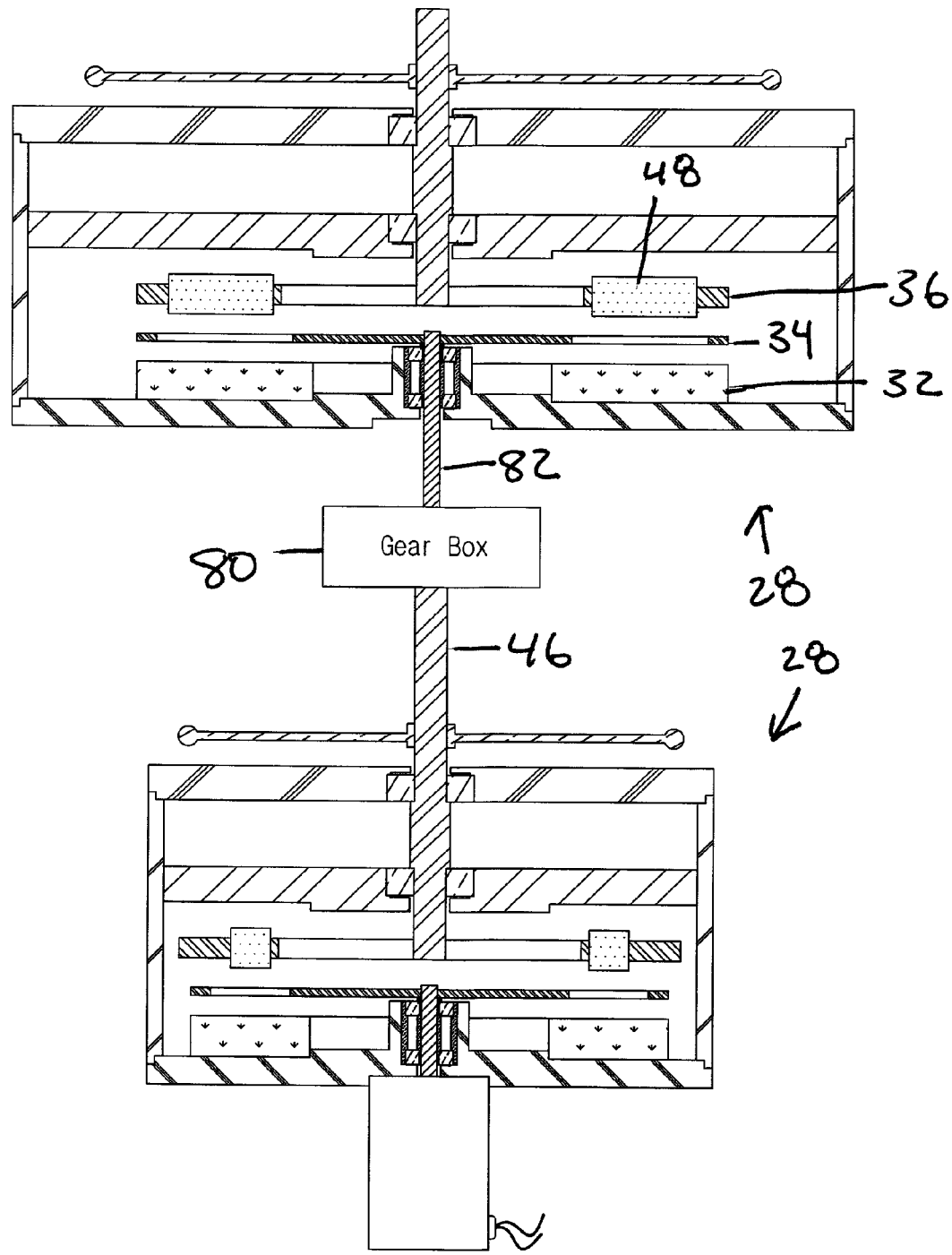
FIG. 18 is a perspective view of a repulsive force conversion drive according to the present invention.

FIG. 18 show a cascading series of repulsive force conversion drives 28 linked together. The repulsive force conversion drives 28 are patterned after the repulsive force conversion drive 28 shown in FIG. 7. The first repulsive force conversion drive 28 includes the small input motor 30. The output shaft 46 is connected to the next repulsive force conversion drive 28 by a gear box 80. There is a gear shaft 82 connected between the motion inducing plate 34 of a second repulsive force conversion drive 28 and the gear box 80. The gear box 80 and gear shaft 82 replace the small input motor 30 in the second repulsive force conversion drive 28. The second repulsive force conversion drive 28 is shown as a larger overall unit having a larger doughnut magnet 32, a larger motion inducing plate 34, a larger magnet array disc 36 and larger disc magnets 48. By connecting repulsive force conversion drives 28 in series, the output of the first repulsive force conversion drive 28 becomes the input of the next repulsive force conversion drive 28 and so on, as additional repulsive force conversion drives 28 are added. In this way, the series of repulsive force conversion drives 28 can produce more power to turn a load.

Figure 19:
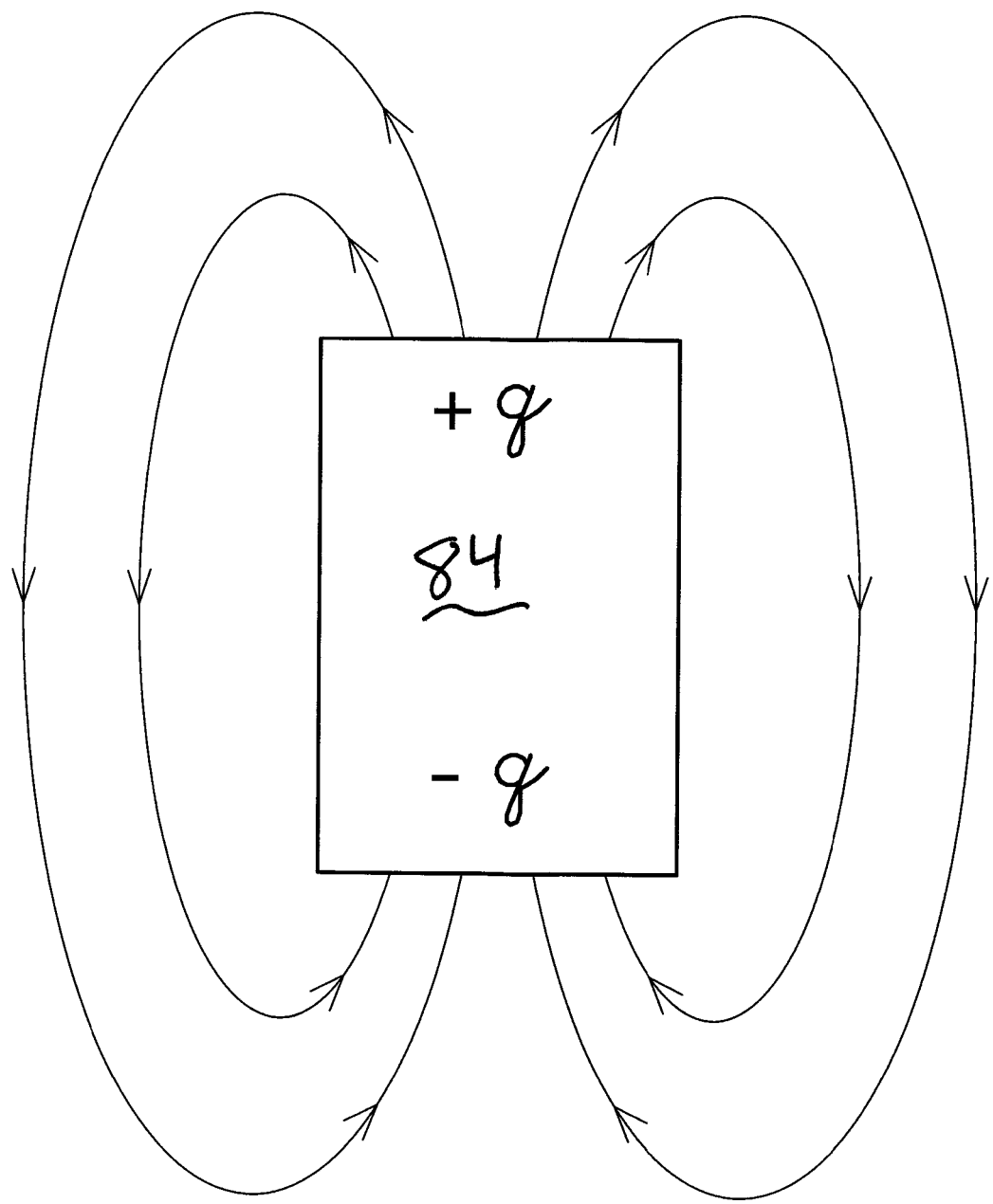
FIG. 19 is a schematic view of an electret.
Figure 20:
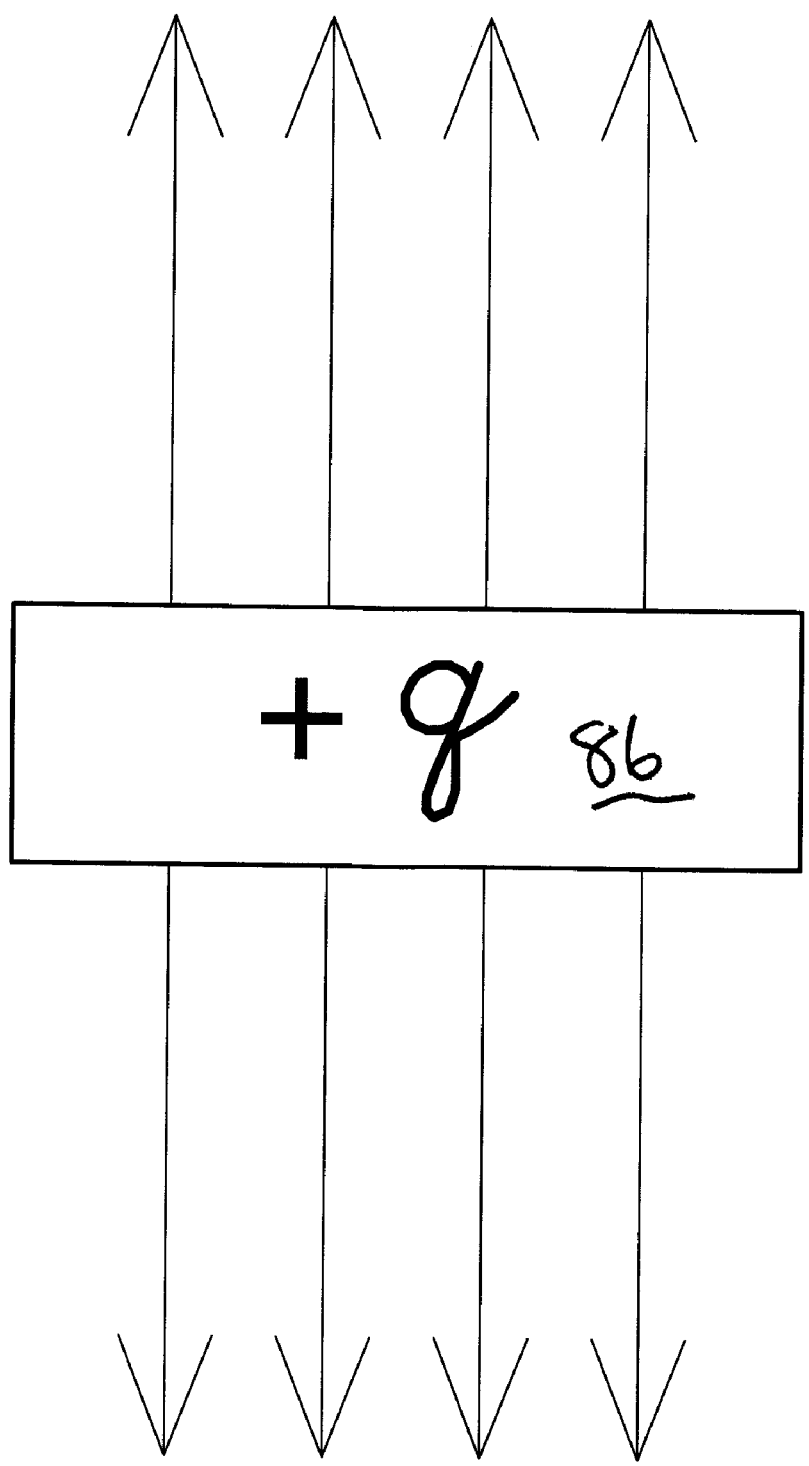
FIG. 20 is a schematic view of an electret.
Figure 21:
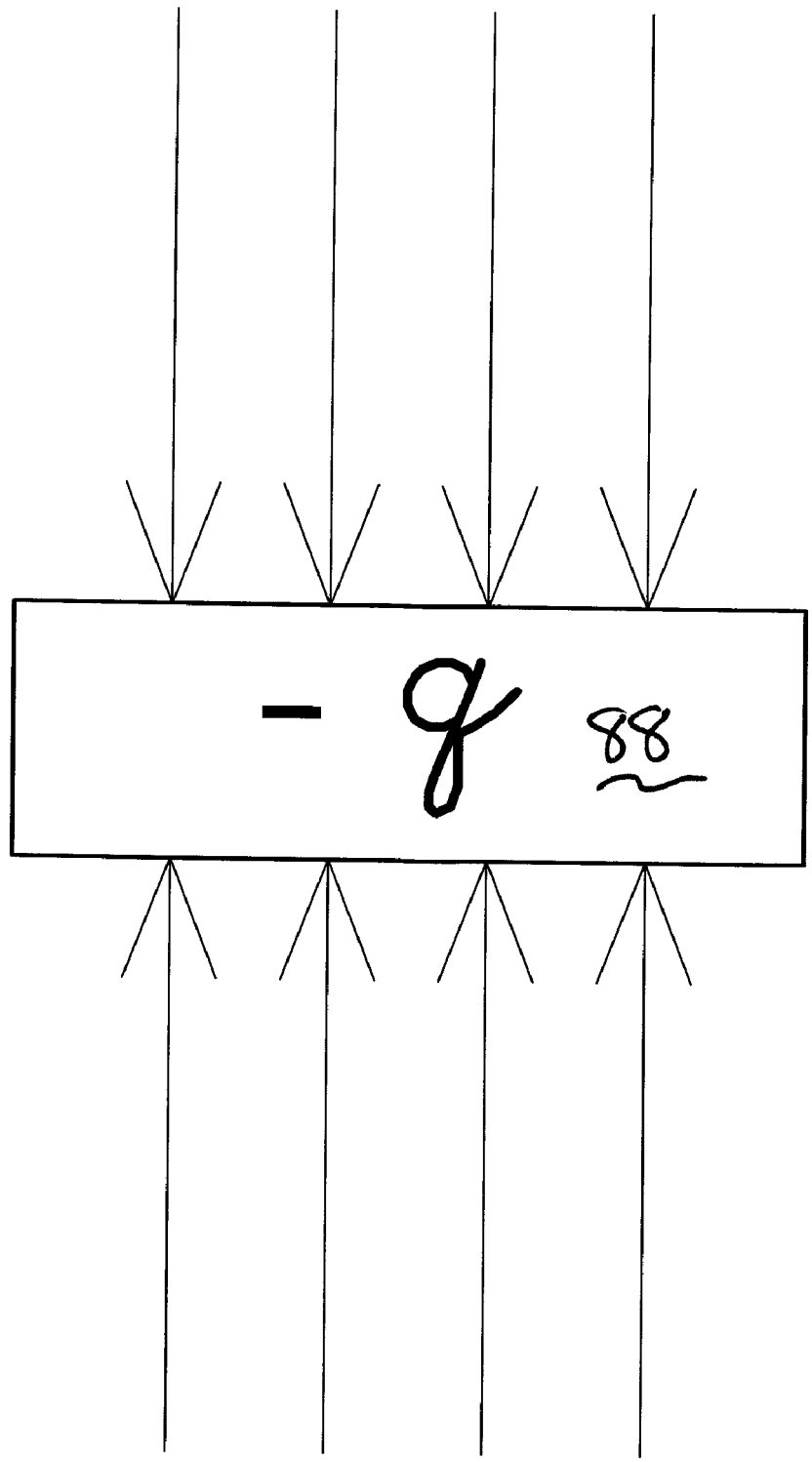
FIG. 21 is a schematic view of an electret.

FIGS. 19-21 show three examples of an electret, which are electrostatic equivalents of a permanent magnet. FIG. 19 shows the first electret is a dipole 84, which has a positive charge (+q) and a negative charge (−q). FIG. 20 shows the second electret 86 only has a positive charge (+q). FIG. 21 shows the third electret 88 only has a negative charge (−q). An electret is a dielectric material that has a quasi-permanent electric charge or dipole polarization. Electret materials are quite common in nature. Quartz and other forms of silicon dioxide, for example, are naturally occurring electrets. Today, most electrets are made from synthetic polymers, e.g. fluoropolymers, polypropylene, polyethyleneterephthalate, etc. Real-charge electrets contain either positive or negative excess charges or both, while oriented-dipole electrets contain oriented dipoles. The quasi-permanent internal or external electric fields created by electrets can be exploited in the present invention.

Figure 22:
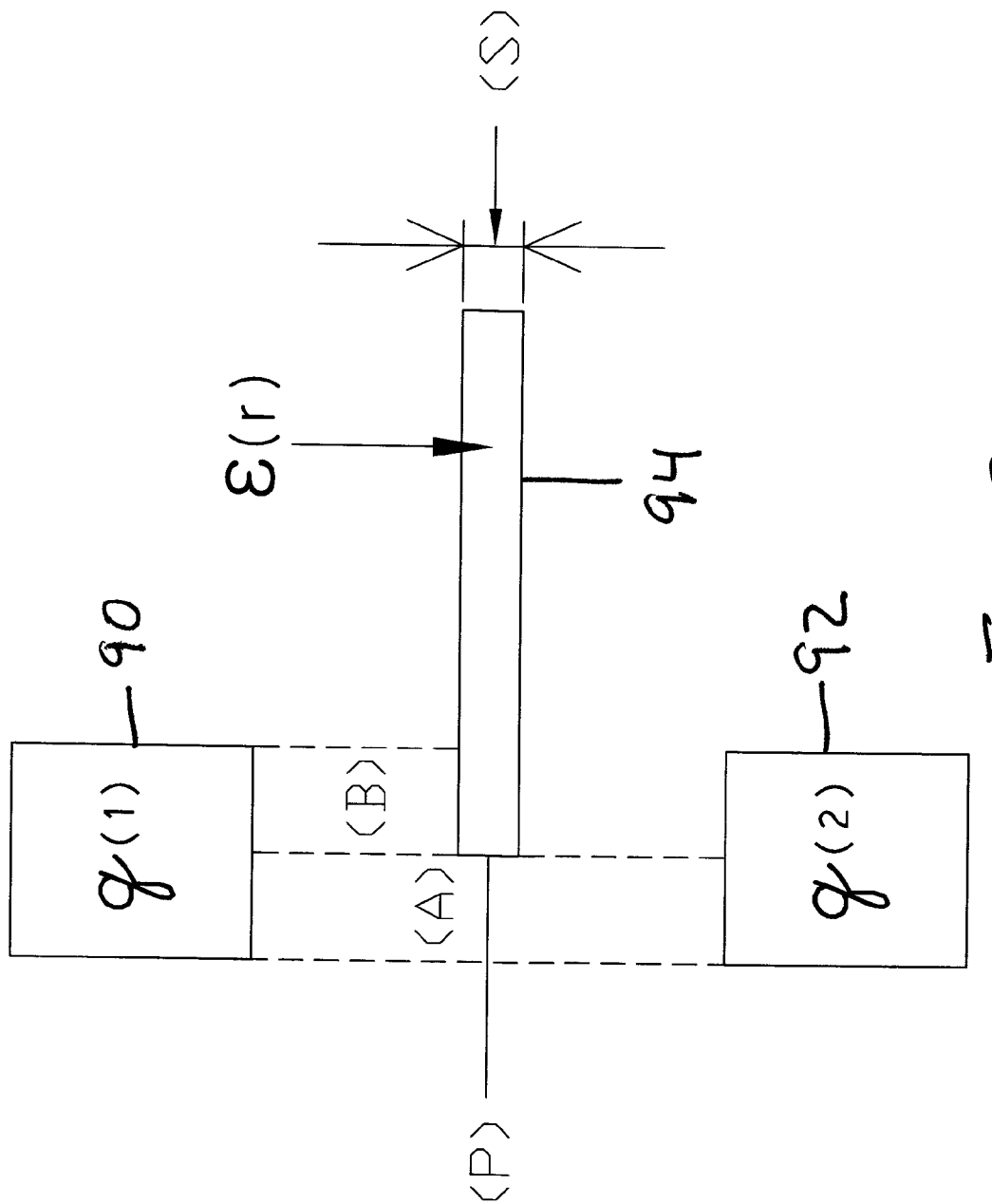
FIG. 22 is a schematic view of two electrets and a motion inducing plate according to the present invention.

FIG. 22 shows two electrets 90, 92 and a motion inducing plate 94 similar to FIG. 5. The two electrets 90, 92 face each other with the same electric charge (+q). Two electrets facing each other with the same electric charge will repel each other in a similar way that magnets repel each other when facing each other with the same polarity. It is not necessary to use a dipole electret in the repulsive force conversion drive, as the single charge electrets can be just as effective. The electret must be designed to maintain the charges on the electret, such that the charges are not lost to the surroundings in which the electret is placed. The main differences between electrets and magnets are the materials, how they are charged, the mathematical equations which govern the repulsive forces and the material type of motion inducing plate which can be used in the repulsive force conversion drive. Electrets can be made from a numerous different materials as compared to magnets. Electrets can be charged or polarized electrically as compared to magnets.

The equations of the forces involved as show in FIG. 22 are as follows. The equation for repulsive force is between the two electrets 90, 92 is:

$$F(1,2) = (1/(4\pi \in_0))(q_{(1)} q_{(2)} / r^2_{(1,2)}),\qquad \text{Equation (5)},$$

where $q_{(1)}$ and $q_{(2)}$ are the electric charges for each electret; $r_{(1,2)}$ is the distance between the electrets; and $\in_0$ is the dielectric permittivity of a vacuum. Instead of magnetic field strength for each magnet, electrets have an electrical field and electrical field strength associated with each charge of each electret. The electrical field is defined by the symbol $\overline{E}$. The electrical field strength at a distance $r_{(1)}$ and $r_{(2)}$ from the electric charge $q_{(1)}$ and $q_{(2)}$ in vacuum, are $\overline{E}_1 = (1/(4\pi \in_0))(q_{(1)}/r^2_{(1)})$ and $\overline{E}_2 = (1/(4\pi \in_0))(q_{(2)}/r^2_{(2)})$, respectively. The electrical field is smallest between two electrets where $\overline{E}_1 = \overline{E}_2$, according to $\overline{E}_{(p)} = \overline{E}_1 - \overline{E}_2$. The material type for the motion inducing plate can be an electrical conductor, such as copper or aluminum. The dielectric permittivity of electrical conductors is $\in_r$ and is very high ($\in_r > \in_0$). A motion inducing plate having a very high dielectric permittivity will prevent the charges on the electrets from repelling each other as they reduce the repulsive force between the electrets 90, 92.

Magnets and electrets are two examples which can be utilized as repulsive units in the repulsive force conversion drive to provide the repulsive force which is converted into kinetic energy. It is envisioned that the magnets or electrets can be replaced by other sources which produce a repulsive force that can be converted by using a motion inducing plate to manipulate the repulsive force and convert the repulsive force into kinetic energy. It is also envisioned that any of the components of any of the embodiments disclosed can be used in the other embodiments disclosed.

Figure 23:
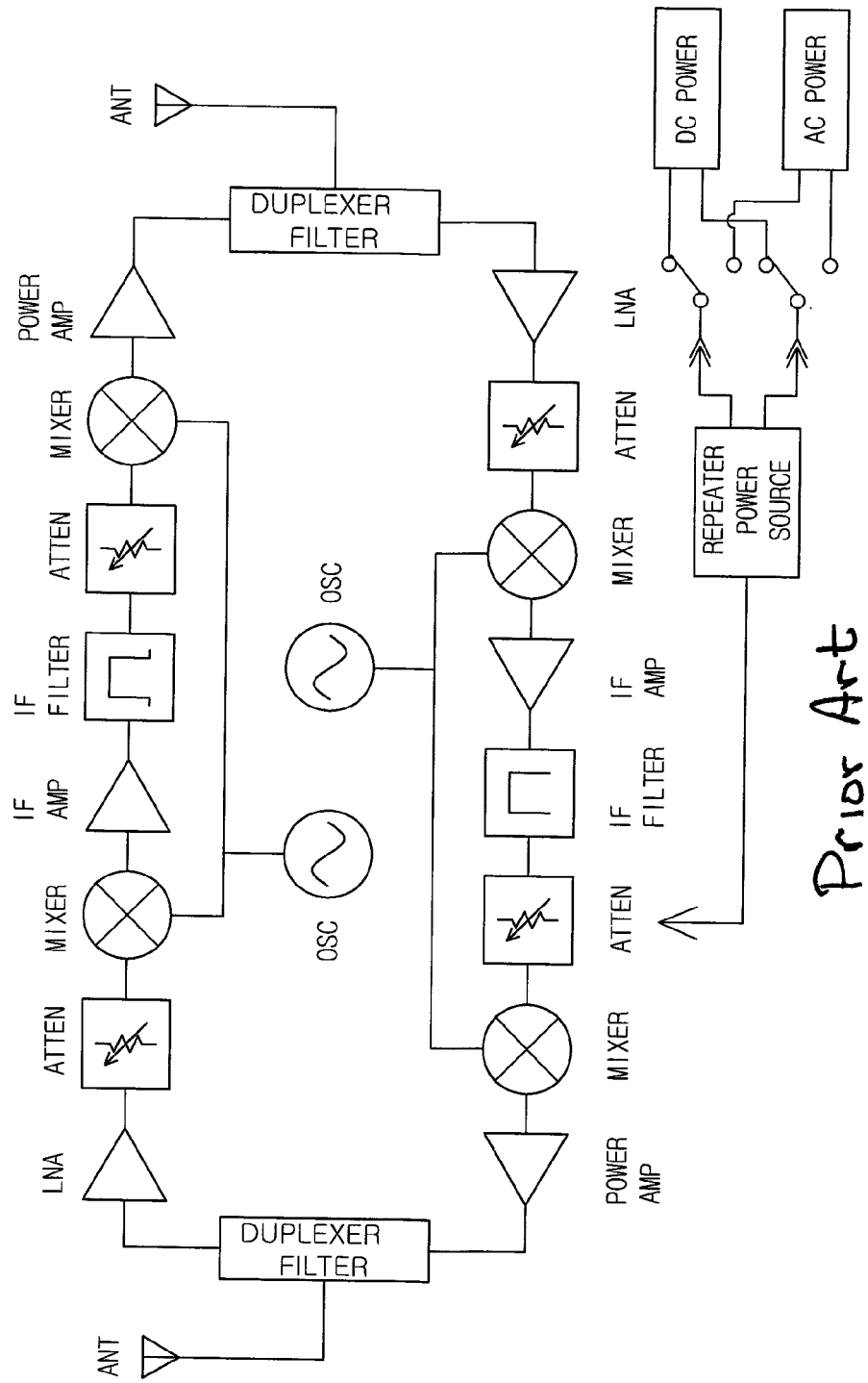
FIG. 23 is a block diagram of a typical repeater circuit with power supply line according to prior art.
Figure 24:
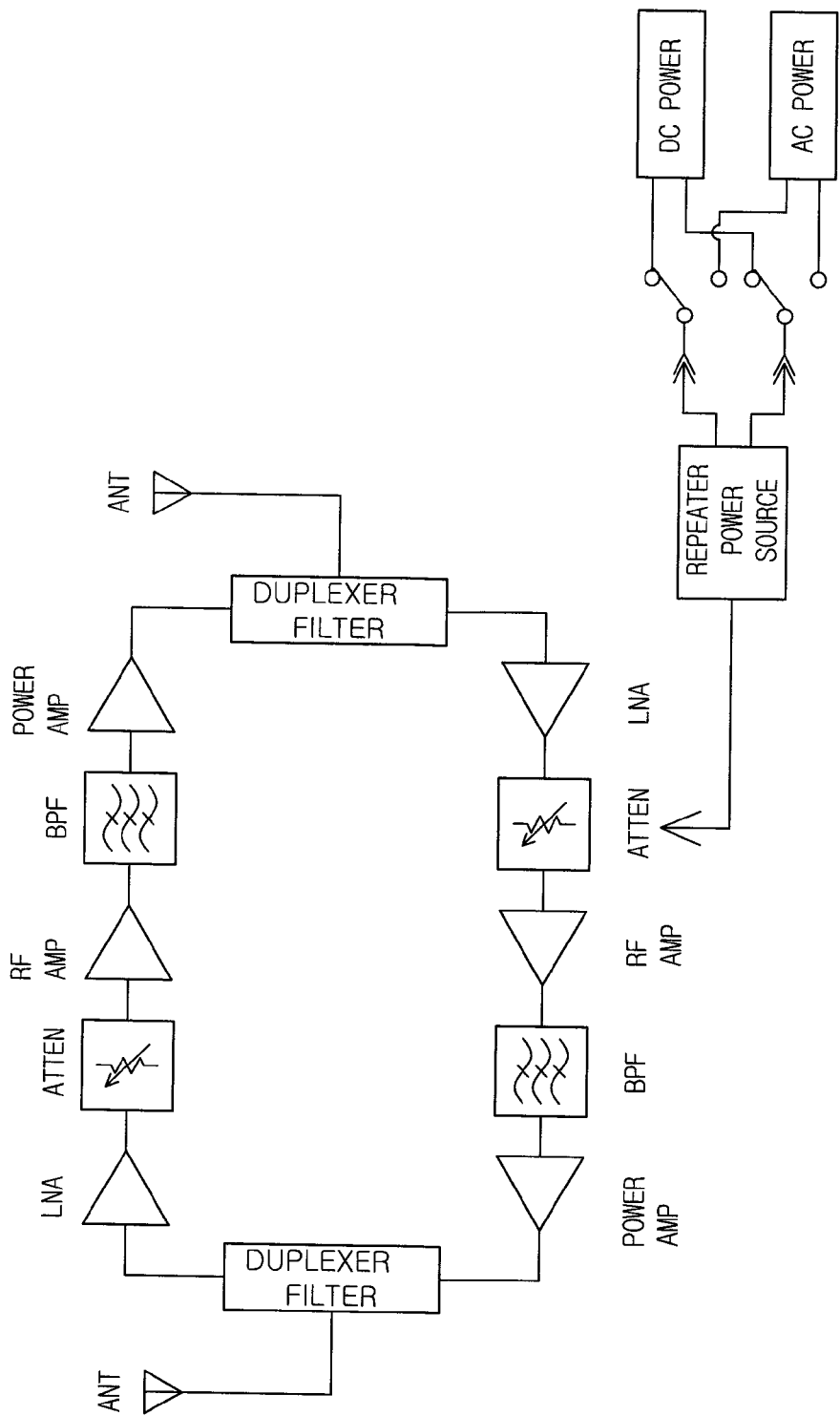
FIG. 24 is a block diagram of an advanced repeater circuit diagram according to prior art.
Figure 25:
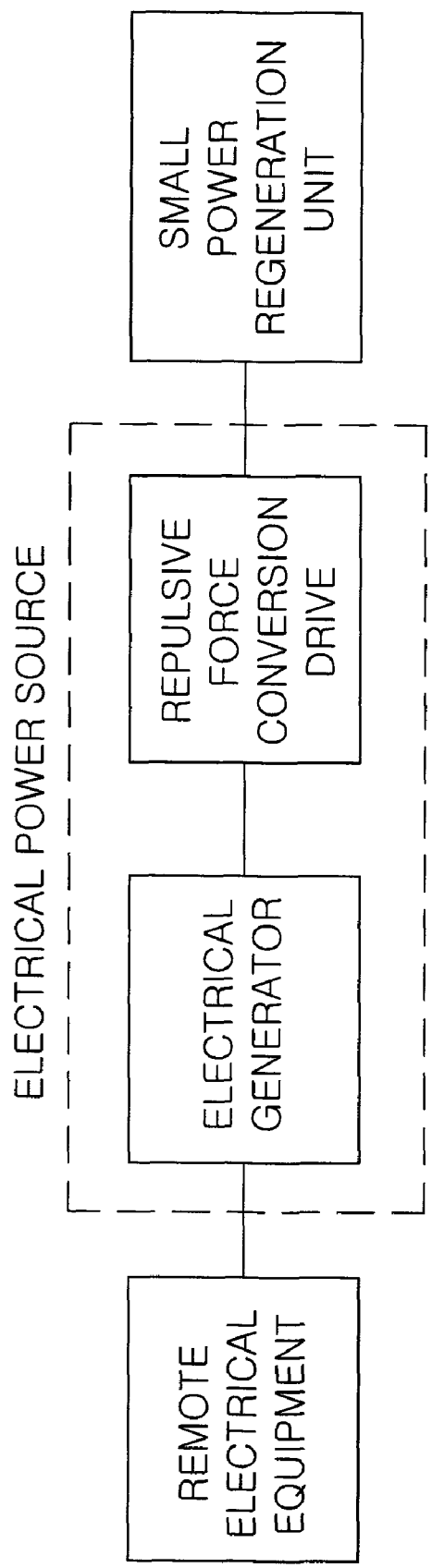
FIG. 25 is a block diagram of electrical equipment power source connected to electrical equipment at a remote location according to the present invention.

FIG. 23 is a block diagram of a typical repeater circuit with power supply line according to prior art. The conventional way to supply the electricity to the repeater is through power line or battery. FIG. 24 is a block diagram of an advanced repeater circuit diagram according to prior art. The new advance repeater is more reliable and durable as compared to the repeater of FIG. 23 since two up and down frequency converter circuits are removed. The repeaters of FIGS. 23-24 are examples of electrical equipment where are used in remote locations. FIG. 25 is a block diagram of electrical equipment power source connected to electrical equipment at a remote location. The remote electrical equipment power source replaces the repeater power sources in FIGS. 23-24. The remote electrical equipment power source includes a repulsive force conversion drive, an electrical generator and small power regeneration unit. The repulsive force conversion drive runs the electrical generator to produce electricity to run repeaters, base stations and other electrical equipment at remote locations. The small power regeneration unit can be solar cells, wind power, water power or other means to charge a small battery to run the small input motor of the repulsive force conversion drive.

Figure 26:
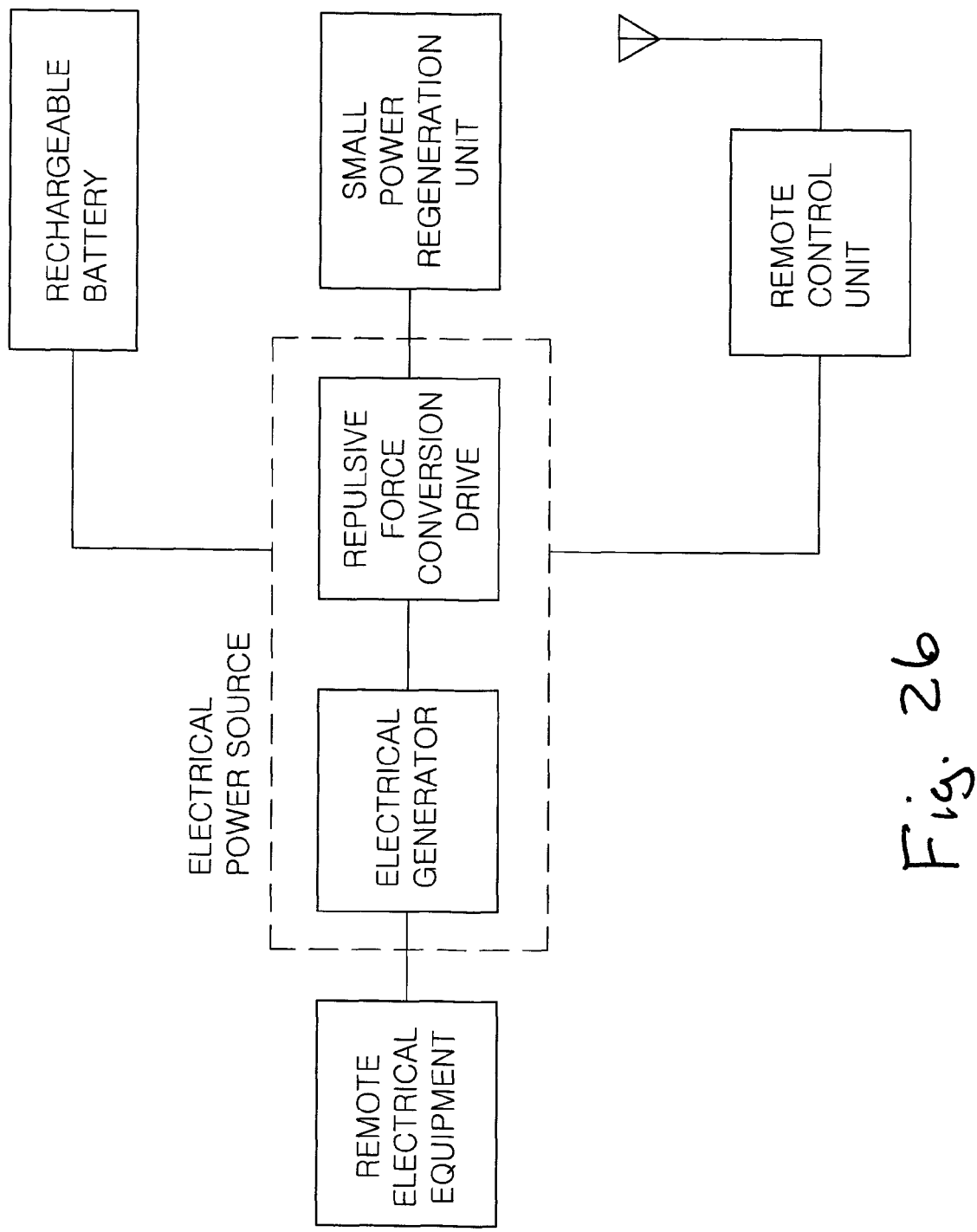
FIG. 26 is a block diagram of a remote electrical equipment power source connected to electrical equipment at a remote location that includes a remote control unit, antenna and rechargeable battery according to the present invention.

FIG. 26 is a block diagram of a remote electrical equipment power source connected to electrical equipment at a remote location that includes a remote control unit, antenna and rechargeable battery. The electrical equipment and remote electrical equipment power source of FIG. 25 can be controlled and monitored on real time basis. The rechargeable battery allows the electrical equipment to operate continuously even during periodic checking or power loss of the remote electrical equipment power source. The rechargeable battery would be charged by the remote electrical equipment power source all the time during normal operations.

While different embodiments of the invention have been described in detail herein, it will be appreciated by those skilled in art that various modifications and alternatives to the embodiments could be developed in light of the overall teachings of the disclosure. Accordingly, the particular arrangements are illustrative only and are not limiting as to the scoop of the invention that is to be given the full breadth of any and all equivalents thereof.

We claim:

1. A remote electrical equipment power source comprising:
a repulsive force conversion drive, comprising:
a first fixed repulsive unit in a fixed position;
a first set of at least one motion repulsive unit suspended above said first fixed repulsive unit, said first set of at least one motion repulsive unit suspended such that said first set of at least one motion repulsive unit and said first fixed repulsive unit repulse each other due to a repulsive force that exists between said first fixed repulsive unit and said motion repulsive unit, said first set of at least one motion repulsive unit suspended such that said first set of at least one motion repulsive unit can move relative to said first fixed repulsive unit;
said first motion inducing plate positioned between said first set of at least one motion repulsive unit and said first fixed repulsive unit and movable between said first set of at least one motion repulsive unit and said first fixed repulsive unit, said first motion inducing plate of a material that reduces said repulsive force between said first set of at least one motion repulsive unit and said first fixed repulsive unit, said first motion inducing plate movable between said first set of at least one motion repulsive unit and said first fixed repulsive unit to cause said first set of at least one motion repulsive unit to move relative to said first fixed repulsive unit; and
a drive mechanism connected to said first set of at least one motion repulsive unit, said drive mechanism connected such that said first set of at least one motion repulsive unit will move said drive mechanism when said first set of at least one motion repulsive unit moves due to said repulsive force between said first set of at least one motion repulsive unit and said first fixed repulsive unit; further including a small input source to move said first motion inducing plate; wherein said small input source includes a input source shaft, said input source shaft rotated by said small input source; wherein said first fixed repulsive unit is positioned to allow passage of said input source shaft; and wherein said first motion inducing plate is mounted to said input source shaft and rotates when said input source shaft rotates; further including a second motion inducing plate mounted to said input source shaft and rotates when said input source shaft rotates, said second motion inducing plate mounted above said first set of at least one motion repulsive unit and said first fixed repulsive unit; further including a second fixed repulsive unit mounted above said second motion inducing plate.

2. The remote electrical equipment power source of claim 1, further including a small power regeneration unit connected to said small input source.

3. The remote electrical equipment power source of claim 1, wherein said first motion inducing plate includes at least one opening to allow said repulsive force between said first set of at least one motion repulsive unit and said first fixed repulsive unit.

4. The remote electrical equipment power source of claim 1, further including an electrical generator adapted to power remote electrical equipment and wherein said drive mechanism is connected to said electrical generator to drive said electrical generator in order to produce electrical power.

5. A remote electrical equipment power source comprising:
a repulsive force conversion drive, comprising:
a first fixed repulsive unit in a fixed position;
a first set of at least one motion repulsive unit suspended above said first fixed repulsive unit, said first set of at least one motion repulsive unit suspended such that said first set of at least one motion repulsive unit and said first fixed repulsive unit repulse each other due to a repulsive force that exists between said first fixed repulsive unit and said motion repulsive unit, said first set of at least one motion repulsive unit suspended such that said first set of at least one motion repulsive unit can move relative to said first fixed repulsive unit;
said first motion inducing plate positioned between said first set of at least one motion repulsive unit and said first fixed repulsive unit and movable between said first set of at least one motion repulsive unit and said first fixed repulsive unit, said first motion inducing plate of a material that reduces said repulsive force between said first set of at least one motion repulsive unit and said first fixed repulsive unit, said first motion inducing plate movable between said first set of at least one motion repulsive unit and said first fixed repulsive unit to cause said first set of at least one motion repulsive unit to move relative to said first fixed repulsive unit; and
a drive mechanism connected to said first set of at least one motion repulsive unit, said drive mechanism connected such that said first set of at least one motion repulsive unit will move said drive mechanism when said first set of at least one motion repulsive unit moves due to said repulsive force between said first set of at least one motion repulsive unit and said first fixed repulsive unit; further including a small input source to move said first motion inducing plate; wherein said small input source includes a input source shaft, said input source shaft rotated by said small input source; wherein said first fixed repulsive unit is positioned to allow passage of said input source shaft; and wherein said first motion inducing plate is mounted to said input source shaft and rotates when said input source shaft rotates;
further including at least one induction drive, said induction drive comprising an output shaft and at least one at least one motion repulsive unit connected to said output shaft of said at least one induction drive; said output shaft of said at least one induction drive and said at least one motion repulsive unit of said at least one induction drive positioned and supported close enough to said first set of at least one motion repulsive unit such that when any repulsive units of said first set of at least one motion repulsive unit and said at least one at least one motion repulsive unit of said at least one induction drive are near each other said any repulsive units will repulse each other and cause said output shaft of said at least one induction drive to rotate.

6. The remote electrical equipment power source of claim 5, further including a small power regeneration unit connected to said small input source.

7. The remote electrical equipment power source of claim 5, wherein said first motion inducing plate includes at least one opening to allow said repulsive force between said first set of at least one motion repulsive unit and said first fixed repulsive unit.

8. The remote electrical equipment power source of claim 5, further including an electrical generator adapted to power remote electrical equipment and wherein said drive mechanism is connected to said electrical generator to drive said electrical generator in order to produce electrical power.

9. A remote electrical equipment power source comprising:
a repulsive force conversion drive, comprising:
a first fixed repulsive unit in a fixed position;
a first set of at least one motion repulsive unit suspended above said first fixed repulsive unit, said first set of at least one motion repulsive unit suspended such that said first set of at least one motion repulsive unit and said first fixed repulsive unit repulse each other due to a repulsive force that exists between said first fixed repulsive unit and said motion repulsive unit, said first set of at least one motion repulsive unit suspended such that said first set of at least one motion repulsive unit can move relative to said first fixed repulsive unit;
said first motion inducing plate positioned between said first set of at least one motion repulsive unit and said first fixed repulsive unit and movable between said first set of at least one motion repulsive unit and said first fixed repulsive unit, said first motion inducing plate of a material that reduces said repulsive force between said first set of at least one motion repulsive unit and said first fixed repulsive unit, said first motion inducing plate movable between said first set of at least one motion repulsive unit and said first fixed repulsive unit to cause said first set of at least one motion repulsive unit to move relative to said first fixed repulsive unit; and
a drive mechanism connected to said first set of at least one motion repulsive unit, said drive mechanism connected such that said first set of at least one motion repulsive unit will move said drive mechanism when said first set of at least one motion repulsive unit moves due to said repulsive force between said first set of at least one motion repulsive unit and said first fixed repulsive unit; further including a small input source to move said first motion inducing plate; wherein said small input source includes a input source shaft, said input source shaft rotated by said small input source; wherein said first fixed repulsive unit is positioned to allow passage of said input source shaft; and wherein said first motion inducing plate is mounted to said input source shaft and rotates when said input source shaft rotates;
further including a second motion inducing plate mounted to said input source shaft and rotates when said input source shaft rotates, said second motion inducing plate mounted above said first set of at least one motion repulsive unit and said first fixed repulsive unit; further including a second set of at least one motion repulsive unit mounted above said second motion inducing plate and connected to said drive mechanism.

10. The remote electrical equipment power source of claim 9, further including a small power regeneration unit connected to said small input source.

11. The remote electrical equipment power source of claim 9, wherein said first motion inducing plate includes at least one opening to allow said repulsive force between said first set of at least one motion repulsive unit and said first fixed repulsive unit.

12. The remote electrical equipment power source of claim 9, further including an electrical generator adapted to power remote electrical equipment and wherein said drive mechanism is connected to said electrical generator to drive said electrical generator in order to produce electrical power.

13. A remote electrical equipment power source comprising:
a repulsive force conversion drive, comprising:
a first fixed repulsive unit in a fixed position;
a first set of at least one motion repulsive unit suspended above said first fixed repulsive unit, said first set of at least one motion repulsive unit suspended such that said first set of at least one motion repulsive unit and said first fixed repulsive unit repulse each other due to a repulsive force that exists between said first fixed repulsive unit and said motion repulsive unit, said first set of at least one motion repulsive unit suspended such that said first set of at least one motion repulsive unit can move relative to said first fixed repulsive unit;
said first motion inducing plate positioned between said first set of at least one motion repulsive unit and said first fixed repulsive unit and movable between said first set of at least one motion repulsive unit and said first fixed repulsive unit, said first motion inducing plate of a material that reduces said repulsive force between said first set of at least one motion repulsive unit and said first fixed repulsive unit, said first motion inducing plate movable between said first set of at least one motion repulsive unit and said first fixed repulsive unit to cause said first set of at least one motion repulsive unit to move relative to said first fixed repulsive unit; and
a drive mechanism connected to said first set of at least one motion repulsive unit, said drive mechanism connected such that said first set of at least one motion repulsive unit will move said drive mechanism when said first set of at least one motion repulsive unit moves due to said repulsive force between said first set of at least one motion repulsive unit and said first fixed repulsive unit;
further including at least one additional repulsive force conversion drive; each of said least one additional repulsive force conversion drives connected to a first repulsive force conversion drive in series; and each of said least one additional repulsive force conversion drives connected in series such that a motion inducing plate of one repulsive force conversion drive is connected to a drive mechanism of another repulsive force conversion drive.

14. The remote electrical equipment power source of claim 13, wherein said first motion inducing plate includes at least one opening to allow said repulsive force between said first set of at least one motion repulsive unit and said first fixed repulsive unit.

15. The remote electrical equipment power source of claim 13, further including an electrical generator adapted to power remote electrical equipment and wherein said drive mechanism is connected to said electrical generator to drive said electrical generator in order to produce electrical power.

16. A remote electrical equipment power source comprising:
a repulsive force conversion drive, comprising:
a first fixed repulsive unit in a fixed position;
a first set of at least one motion repulsive unit suspended above said first fixed repulsive unit, said first set of at least one motion repulsive unit suspended such that said first set of at least one motion repulsive unit and said first fixed repulsive unit repulse each other due to a repulsive force that exists between said first fixed repulsive unit and said motion repulsive unit, said first set of at least one motion repulsive unit suspended such that said first set of at least one motion repulsive unit can move relative to said first fixed repulsive unit;

said first motion inducing plate positioned between said first set of at least one motion repulsive unit and said first fixed repulsive unit and movable between said first set of at least one motion repulsive unit and said first fixed repulsive unit, said first motion inducing plate of a material that reduces said repulsive force between said first set of at least one motion repulsive unit and said first fixed repulsive unit, said first motion inducing plate movable between said first set of at least one motion repulsive unit and said first fixed repulsive unit to cause said first set of at least one motion repulsive unit to move relative to said first fixed repulsive unit; and a drive mechanism connected to said first set of at least one motion repulsive unit, said drive mechanism connected such that said first set of at least one motion repulsive unit will move said drive mechanism when said first set of at least one motion repulsive unit moves due to said repulsive force between said first set of at least one motion repulsive unit and said first fixed repulsive unit; further including a small input source to move said first motion inducing plate; wherein said small input source includes a input source shaft, said input source shaft rotated by said small input source; wherein said first fixed repulsive unit is positioned to allow passage of said input source shaft; and wherein said first motion inducing plate is mounted to said input source shaft and rotates when said input source shaft rotates;

further including at least one additional repulsive force conversion drive; each of said least one additional repulsive force conversion drives connected to a first repulsive force conversion drive in series; and each of said least one additional repulsive force conversion drives connected in series such that a motion inducing plate of one repulsive force conversion drive is connected to a drive mechanism of another repulsive force conversion drive.

17. The remote electrical equipment power source of claim 16, further including a small power regeneration unit connected to said small input source.

18. The remote electrical equipment power source of claim 16, wherein said first motion inducing plate includes at least one opening to allow said repulsive force between said first set of at least one motion repulsive unit and said first fixed repulsive unit.

19. The remote electrical equipment power source of claim 16, further including an electrical generator adapted to power remote electrical equipment and wherein said drive mechanism is connected to said electrical generator to drive said electrical generator in order to produce electrical power.

20. A remote electrical equipment power source comprising:

a repulsive force conversion drive, comprising:
a first fixed repulsive unit in a fixed position;
a first set of at least one motion repulsive unit suspended above said first fixed repulsive unit, said first set of at least one motion repulsive unit suspended such that said first set of at least one motion repulsive unit and said first fixed repulsive unit repulse each other due to a repulsive force that exists between said first fixed repulsive unit and said motion repulsive unit, said first set of at least one motion repulsive unit suspended such that said first set of at least one motion repulsive unit can move relative to said first fixed repulsive unit;

said first motion inducing plate positioned between said first set of at least one motion repulsive unit and said first fixed repulsive unit and movable between said first set of at least one motion repulsive unit and said first fixed repulsive unit, said first motion inducing plate of a material that reduces said repulsive force between said first set of at least one motion repulsive unit and said first fixed repulsive unit, said first motion inducing plate movable between said first set of at least one motion repulsive unit and said first fixed repulsive unit to cause said first set of at least one motion repulsive unit to move relative to said first fixed repulsive unit; and a drive mechanism connected to said first set of at least one motion repulsive unit, said drive mechanism connected such that said first set of at least one motion repulsive unit will move said drive mechanism when said first set of at least one motion repulsive unit moves due to said repulsive force between said first set of at least one motion repulsive unit and said first fixed repulsive unit;

further including a small input source to move said first motion inducing plate and further including a small power regeneration unit connected to said small input source.

21. The remote electrical equipment power source of claim 20, wherein said first motion inducing plate includes at least one opening to allow said repulsive force between said first set of at least one motion repulsive unit and said first fixed repulsive unit.

22. The remote electrical equipment power source of claim 20, further including an electrical generator adapted to power remote electrical equipment and wherein said drive mechanism is connected to said electrical generator to drive said electrical generator in order to produce electrical power.

23. The remote electrical equipment power source of claim 20, wherein said first motion inducing plate includes at least one opening to allow said repulsive force between said first set of at least one motion repulsive unit and said first fixed repulsive unit.

24. The remote electrical equipment power source of claim 23, wherein said small input source includes a input source shaft, said input source shaft rotated by said small input source; wherein said first fixed repulsive unit is positioned to allow passage of said input source shaft; and wherein said first motion inducing plate is mounted to said input source shaft and rotates when said input source shaft rotates.

25. A method of producing a powered output to electrical equipment at a remote location, comprising:

positioning a first fixed repulsive unit in a fixed position;

positioning a first set of at least one motion repulsive unit suspended above said first fixed repulsive unit, the first set of at least one motion repulsive unit suspended such that the first set of at least one motion repulsive unit and the first fixed repulsive unit repulse each other due to a repulsive force that exists between the first fixed repulsive unit and the motion repulsive unit, the first set of at least one motion repulsive unit suspended such that the first set of at least one motion repulsive unit can move relative to the first fixed repulsive unit;

positioning a drive mechanism connected to the first set of at least one motion repulsive unit, the drive mechanism connected such that the first set of at least one motion repulsive unit will move the drive mechanism when the first set of at least one motion repulsive unit moves due to the repulsive force between the first set of at least one motion repulsive unit and the first fixed repulsive unit;

moving a first motion inducing plate positioned between the first set of at least one motion repulsive unit and the first fixed repulsive unit to cause the first set of at least one motion repulsive unit to move relative to the first fixed repulsive unit and put the drive mechanism into operation, the first motion inducing plate being of a material that reduces the repulsive force between the first set of at least one motion repulsive unit and the first fixed repulsive unit;

driving an electrical generator connected to the drive mechanism due to movement of the drive mechanism in order to produce power from the electrical generator;

providing the produce power to the electrical equipment from the electrical generator;

providing a small input source to move the first motion inducing plate;

providing a small power regeneration unit connected to said small input source.

* * * * *